(12) United States Patent
Tokoi et al.

(10) Patent No.: US 6,380,979 B1
(45) Date of Patent: *Apr. 30, 2002

(54) SCANNING LINE CONVERTING CIRCUIT AND INTERPOLATION COEFFICIENT GENERATING CIRCUIT

(75) Inventors: Masaki Tokoi; Isao Kawahara; Tomohisa Tagami, all of Osaka (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,448

(22) Filed: Jul. 1, 1997

(30) Foreign Application Priority Data

Jul. 2, 1996 (JP) .............................. 8-172706
Dec. 26, 1996 (JP) .............................. 8-347419

(51) Int. Cl.⁷ ................................ H04N 7/01

(52) U.S. Cl. .................. 348/458; 348/452; 348/445

(58) Field of Search ................ 348/443–448, 348/452, 451, 556, 558

(56) References Cited

U.S. PATENT DOCUMENTS

| 4,694,337 | A | * | 9/1987 | Lyons | ............... 348/458 |
|---|---|---|---|---|---|
| 5,034,814 | A | | 7/1991 | Watson | |
| 5,583,575 | A | * | 12/1996 | Arita et al. | ............ 348/451 |
| 5,677,738 | A | * | 10/1997 | Mizutani et al. | ...... 348/458 |
| 5,748,250 | A | * | 5/1998 | Markandey et al. | ... 348/451 |
| 5,793,435 | A | * | 8/1998 | Ward et al. | ............ 348/448 |
| 5,825,429 | A | * | 10/1998 | Shirahata | ............ 348/452 |

FOREIGN PATENT DOCUMENTS

| EP | 0 003 182 | | 7/1979 | |
|---|---|---|---|---|
| EP | 332424 | * | 10/1989 | ............ H04N/7/01 |
| EP | 0 337 424 | | 10/1989 | |
| EP | 0 400 752 | | 12/1990 | |
| EP | 0 507 159 A1 | | 10/1992 | |
| EP | 0400252 | * | 12/1994 | |

(List continued on next page.)

OTHER PUBLICATIONS

Basile, "Baseband Video Processing and the Transmission of HDTV Signals", IEEE Transactions on Circuits and Systems for Video Technology, Mar. 1991, No. 1, New York., pp. 113–124.

*Primary Examiner*—Victor R. Kostak
(74) *Attorney, Agent, or Firm*—McDermott, Will & Emery

(57) ABSTRACT

There is provided a low-cost scanning line converting circuit being capable of properly converting the number of scanning lines for a video signal at various conversion ratios. Under the control of a write control signal generating circuit, an original video signal is written, on a scanning-line basis, in individual line memories. A write operation is performed to each of the line memories based on a clock and a horizontal synchronizing signal on the input side, while a read operation is performed to each of the line memories based on a clock and a horizontal synchronizing signal on the output side. A selecting circuit selects, based on a line select signal, at least one from scanning line signals stored in the individual line memories necessary to generate a post-conversion scanning line signal and outputting the selected scanning line signal. Coefficient multipliers multiply the scanning line signal selectively outputted by interpolation coefficients (1−k) and k and an adder adds up the results of multiplication to output the sum as the post-conversion scanning line signal. A coefficient control circuit and a dividing circuit are capable of generating a coefficient direct signal k in accordance with a ratio for converting the number of signal lines.

19 Claims, 32 Drawing Sheets

FOREIGN PATENT DOCUMENTS

| | | | |
|---|---|---|---|
| EP | 0630154 | * | 12/1994 |
| EP | 0 630 154 A2 | | 12/1994 |
| EP | 0 794 525 A2 | | 9/1997 |
| GB | 1326 386 | | 8/1973 |
| GB | 1455821 | * | 11/1976 |
| GB | 2 263 374 A | | 7/1993 |
| GB | 2283374 | * | 7/1993 |
| JP | 63-156486 | | 6/1988 |
| JP | 5-103305 | | 4/1993 |
| JP | 6-62267 | | 3/1994 |
| JP | 9-130755 | | 5/1997 |
| WO | WO 97/01929 | | 1/1997 |

* cited by examiner

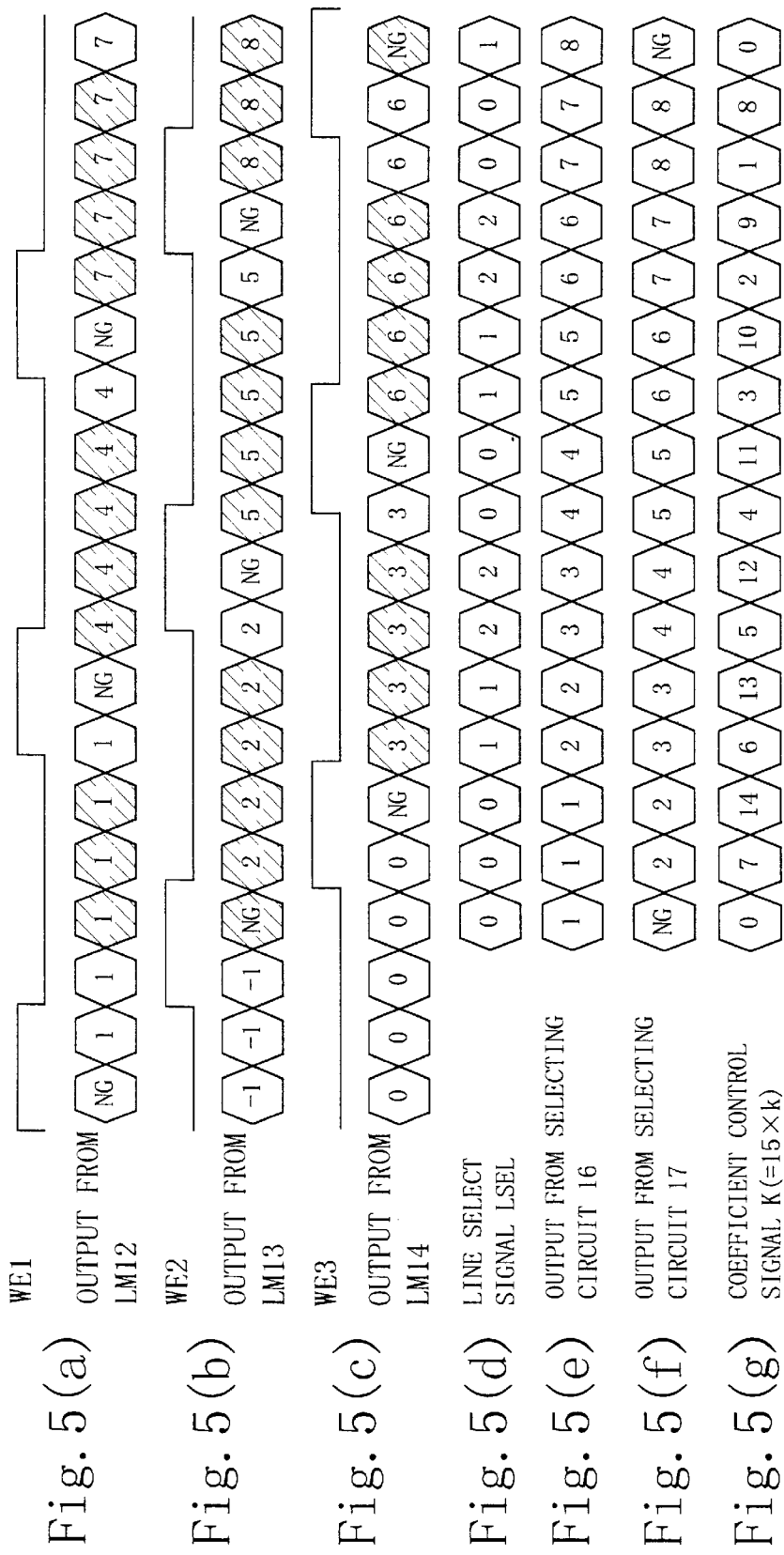

Fig. 6

| BEFORE CONVERSION 19 | | AFTER CONVERSION 16 | LINE IN USE | COEFFICIENT (1-k, k) |
|---|---|---|---|---|
| 1 | 16/16 → | 1 | (1, -) | (16/16, 0/16) |
| 2 | 13/16 | 2 | (2, 3) | (13/16, 3/16) |
| 3 | 3/16, 10/16 | 3 | (3, 4) | (10/16, 6/16) |
| 4 | 6/16, 7/16 | 4 | (4, 5) | (7/16, 9/16) |
| 5 | 9/16, 4/16 | 5 | (5, 6) | (4/16, 12/16) |
| 6 | 12/16, 1/16 | 6 | (6, 7) | (1/16, 15/16) |
| 7 | 15/16 | 7 | (8, 9) | (14/16, 2/16) |
| 8 | 14/16, 2/16 | 8 | (9, 10) | (11/16, 5/16) |
| 9 | 11/16, 5/16 | 9 | (10, 11) | (8/16, 8/16) |
| 10 | 8/16 | 10 | (11, 12) | (5/16, 11/16) |
| 11 | 8/16, 5/16 | 11 | (12, 13) | (2/16, 14/16) |
| 12 | 11/16, 12/16 | 12 | (14, 15) | (15/16, 1/16) |
| 13 | 14/16 | 13 | (15, 16) | (12/16, 4/16) |
| 14 | 15/16, 1/16 | 14 | (16, 17) | (9/16, 7/16) |
| 15 | 12/16, 4/16 | 15 | (17, 18) | (6/16, 10/16) |
| 16 | 9/16, 7/16 | 16 | (18, 19) | (3/16, 13/16) |
| 17 | 6/16, 10/16 | 17 | (20, -) | (16/16, 0/16) |
| 18 | 3/16, 13/16 | 18 | (21, 22) | (13/16, 3/16) |
| 20 | 16/16 → | | | |
| 21 | 13/16, 3/16 | | | |
| 22 | | | | |

Before conversion: VERTICAL DIRECTION, ONE CYCLE

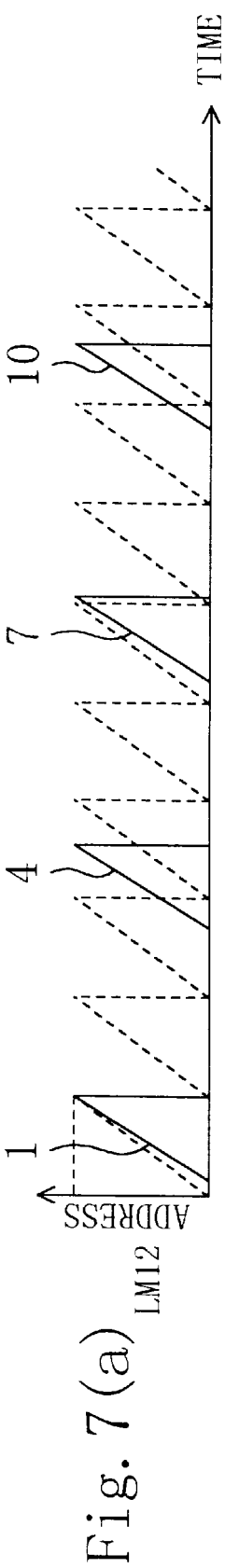
Fig. 7(a) LM12
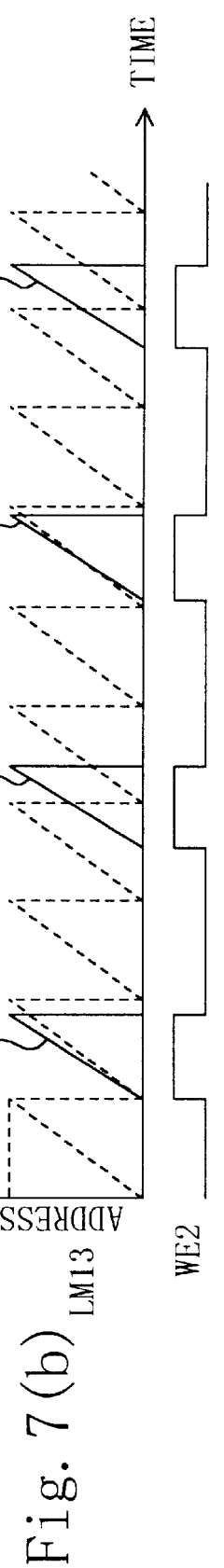
Fig. 7(b) LM13
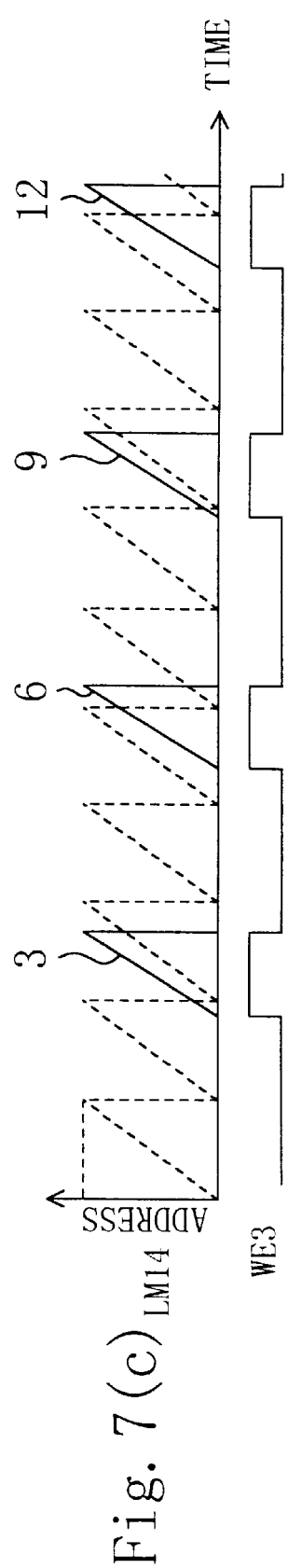
Fig. 7(c) LM14

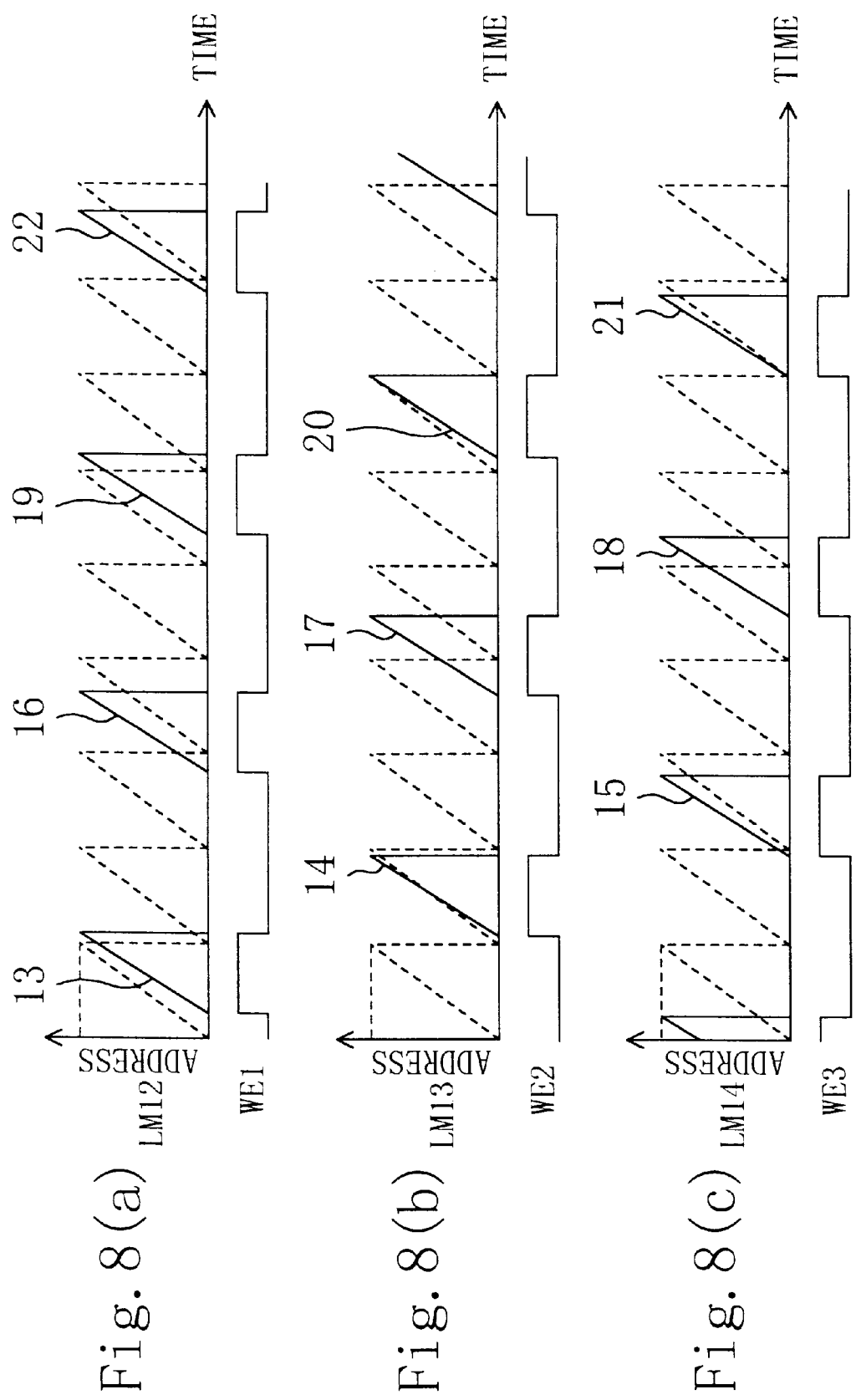

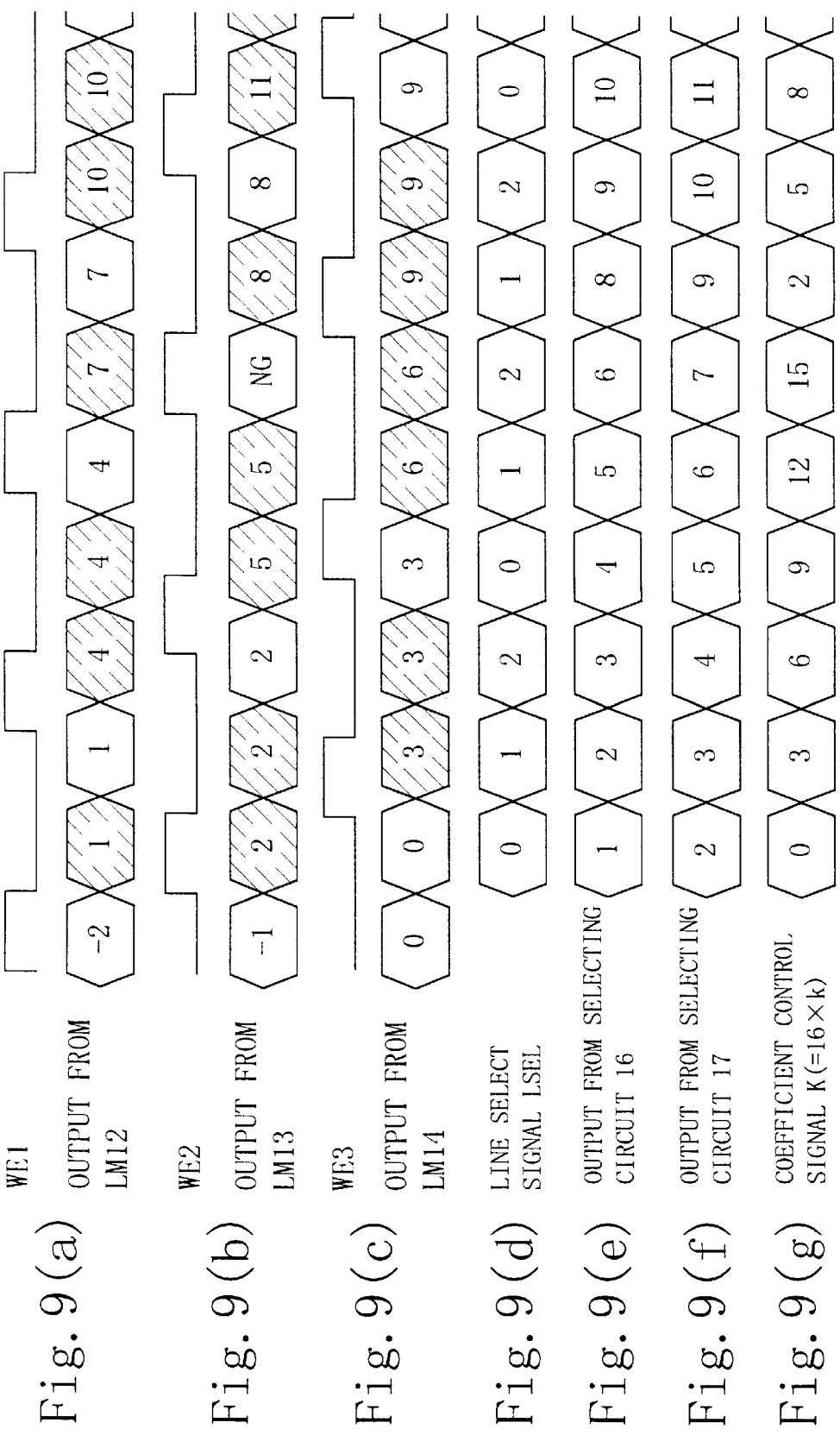

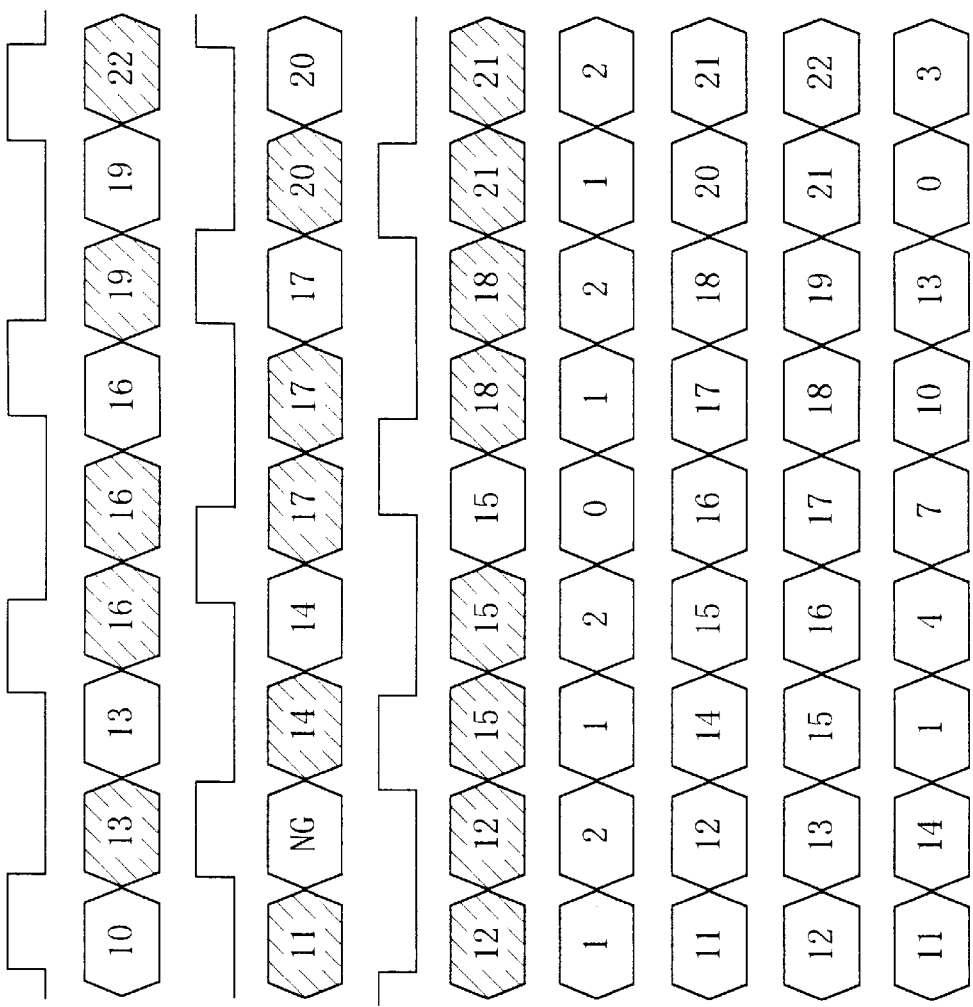

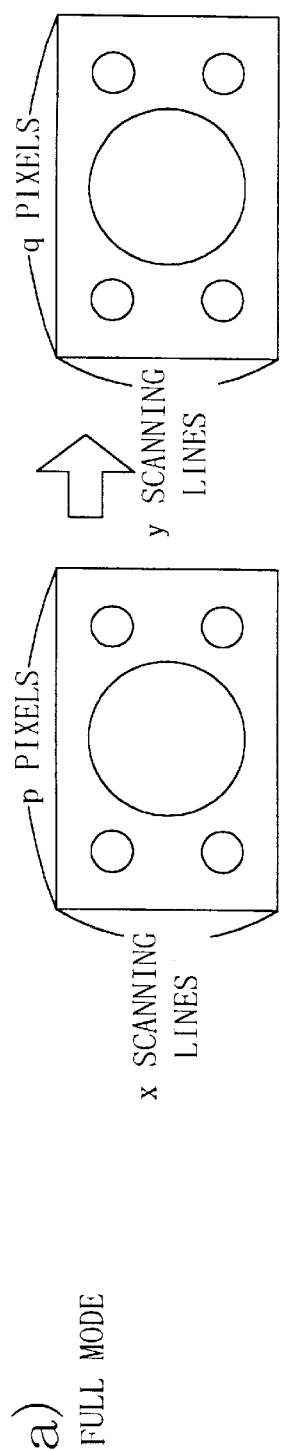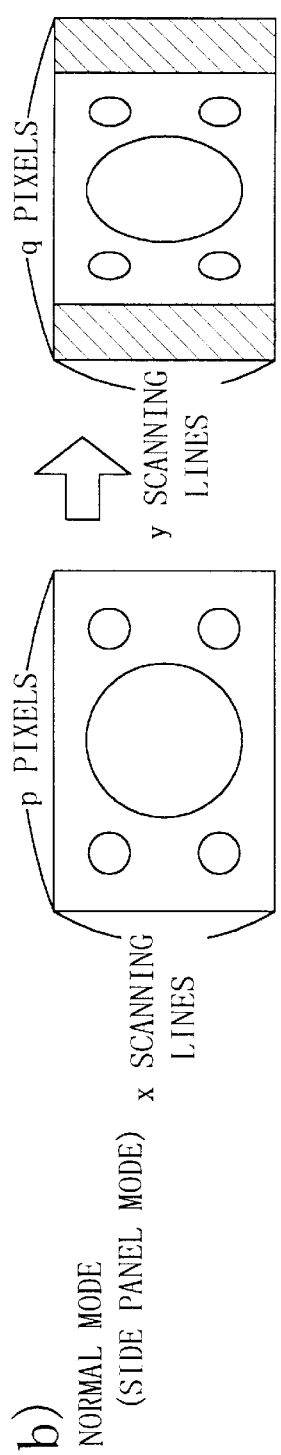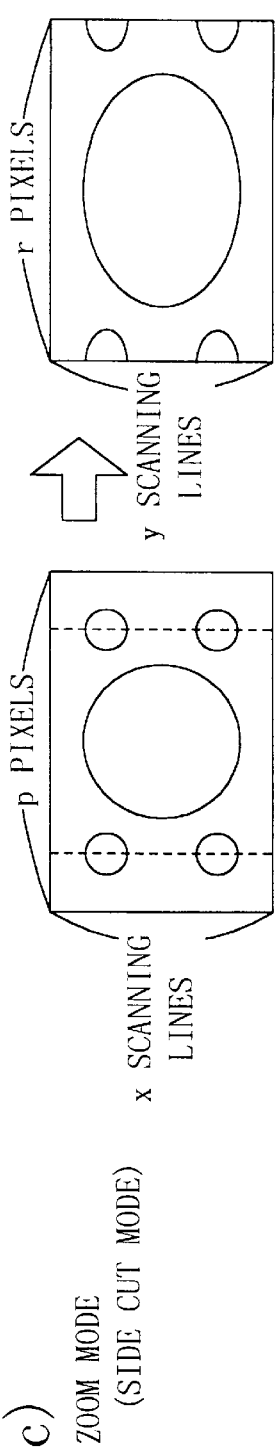
Fig. 22(a) FULL MODE
Fig. 22(b) NORMAL MODE (SIDE PANEL MODE)
Fig. 22(c) ZOOM MODE (SIDE CUT MODE)

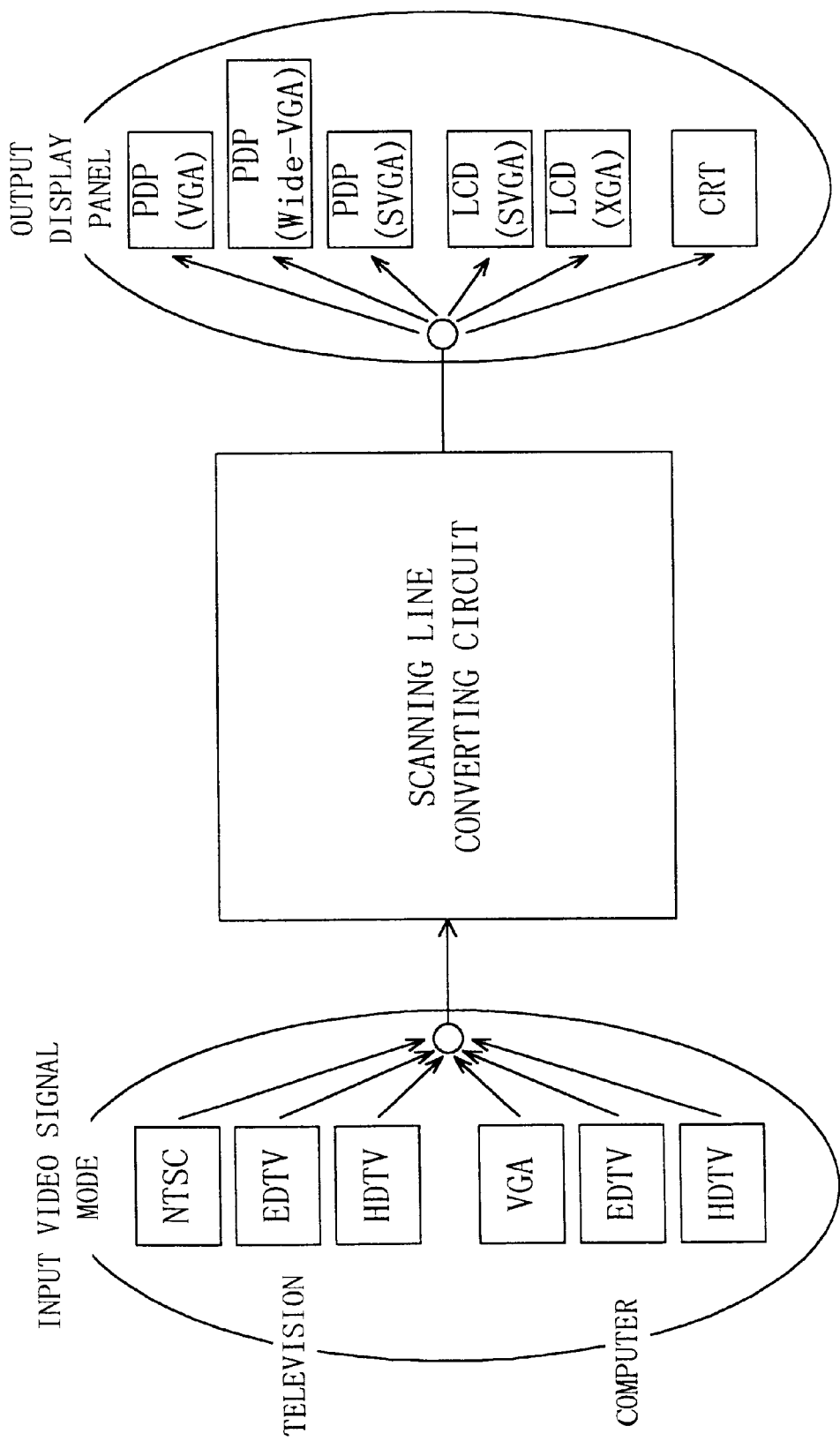

SCANNING LINE CONVERTING CIRCUIT AND INTERPOLATION COEFFICIENT GENERATING CIRCUIT

BACKGROUND OF THE INVENTION

The present invention relates to a scanning line converting circuit having the function of converting the number of scanning lines for a video signal inputted thereto and outputting another video signal having a different number of scanning lines.

Since the arrival of the multimedia age, systems for image media have greatly been diversified. In the field of television broadcasting, newly developed image display systems of EDTV (Extended Definition TeleVision) and HDTV (High Definition TeleVision) have been used in addition to the conventional NTSC system. European countries have their own image display systems of PAL and SECAM. In the field of computer graphics, there are image display systems peculiar to individual computer producers besides VGA, SVGA, and XGA, which are well known. However, it is substantially impossible for the viewer to prepare a versatile image receiving terminal compatible with all the image display systems. As a result, technology which allows images in different systems to be shown on a single display has been valued increasingly in recent years.

In the field of display devices, the advancement of flat panel displays including a PDP (Plasma Display Panel) and a LCD (Liquid Crystal Display) is remarkable. Unlike a CRT, a flat panel display is a dot matrix-display having a specified dot size. In accordance with their, applications, there are various flat panel displays of different dot sizes compatible with VGA, SVGA, and like systems. Hence, it is also important to provide technology which allows a single image source to be shown on different-sized displays possessed by the viewers.

From the foregoing, it can be concluded that a scanning line converting circuit having multisource/multipanel compatibility to allow various image sources to be shown on various display panels plays a significant role in the multimedia age. Accordingly, the demand grows for a low-cost scanning line converting circuit capable of converting the number of scanning lines at an arbitrary conversion ratio.

FIG. 31 is a block diagram showing the structure of a scanning line converting circuit according to a first conventional embodiment. Original video signals inputted to an input terminal IN are converted to digital video signals by an A/D converter 101, which are stored in a field memory 102 on a field basis. A time base converting circuit 103 receives the video signals from the field memory 102 on a scanning-line basis and overreads, several times, the received scanning lines on the output side by using a post-conversion sampling clock. The overread scanning lines are smoothed by a conversion filter 104 to form vertically smooth video signals, which are converted by a D/A converter 105 to analog video signals and outputted from an output terminal OUT (see Japanese laid-Open Patent Publication HEI 6-62267).

As a second conventional embodiment, there has been proposed a scanning line converting circuit for converting the number of scanning lines at a specified conversion ratio by using only a line memory (see Japanese Laid-Open Patent Publication HEI 5-103305).

In terms of the foregoing multisource/multipanel compatibility, however, the scanning line converting circuit according to the first conventional embodiment has the drawbacks of high cost and large circuit size because of a large-capacity memory, such as a field memory, used therein.

As for the scanning line converting circuit according to the second conventional embodiment, it needs different filtering coefficients corresponding to different ratios for converting the scanning lines, so that numerous filtering coefficients should be prepared if conversion is to be made at an arbitrary conversion ratio, which is practically impossible. In the case where only conversion ratios of integral multiples such as 3:1 and 1:2 are prepared, if conversion is to be made at an arbitrary conversion ratio, interference between a write address and a read address in the line memory, i.e., the outstripping of a write operation by a read operation or the outstripping of a read operation by a write operation prevents proper conversion of the number of scanning lines.

SUMMARY OF THE INVENTION

It is therefore an object of the present invention to provide a low-cost scanning line converting circuit being capable of properly converting the number of scanning lines for a video signal at various conversion ratios. Another object of the present invention is to provide a scanning line converting circuit being capable of converting a system for scanning a video signal and changing the setting of an aspect ratio.

Specifically, the present invention provides a scanning line converting circuit for converting the number of scanning lines for a video signal, comprising: scanning-line selective outputting means for selecting, from scanning line signals composing an original video signal, at least one necessary to generate a post-conversion scanning line signal and outputting the selected scanning line signal; and scanning line interpolating means having interpolation coefficient generating means for generating an interpolation coefficient based on a predetermined scanning line conversion ratio, the scanning line interpolating means multiplying the scanning line signal selectively outputted from the scanning-line selective outputting means by the interpolation coefficient generated from the interpolation coefficient generating means and adding up the results of multiplication to generate the post-conversion scanning line signal, the interpolation coefficient generating means being so constituted as to generate the interpolation coefficient based on at least two scanning line conversion ratios.

According to the present invention, the scanning-line interpolating means multiplies, by the interpolation coefficient, the scanning line signal selectively outputted from the scanning-line selective outputting means and adds up the results of multiplications to generate a post-conversion scanning line signal. The interpolation coefficient as the multiplier factor is generated from the interpolation-coefficient generating means. Since the interpolation-coefficient generating means is so constituted as to generate the interpolation coefficient based on at least two ratios for converting the scanning lines, the number of scanning lines can be converted without increasing or changing circuits at a conversion ratio for which the interpolation coefficient generating means can generate the interpolation coefficient. As a result, the number of scanning lines can be converted properly at various conversion ratios.

Preferably, the interpolation coefficient generating means generates, when the predetermined scanning line conversion ratio is x:y, $(1-K/y)$ and $(K/y)$ as respective interpolation coefficients for the chronologically anterior one and the chronologically posterior one of two scanning line signals necessary to generate the post-conversion scanning line signal (where $K=(LN \times x)\%y$ is satisfied, LN is a number assigned to the post-conversion scanning line signal, and % is remainder calculation).

The present invention also provides a scanning line converting circuit for converting the number of signal lines for a video signal, comprising: scanning-line selective outputting means having a plurality of line memories for storing an original video signal on a scanning-line basis, the scanning-line selective outputting means selecting, from scanning line signals stored in the plurality of line memories, at least one necessary to generate a post-conversion scanning line signal and outputting the selected scanning line signal; and scanning line interpolating means for multiplying the scanning line signal selectively outputted from the scanning-line selective outputting means by an interpolation coefficient and adding up the results of multiplication to generate the post-conversion scanning line signal, the scanning-line selective outputting means being constituted such that respective speeds and timings for signal inputting and signal outputting are independently set and that the scanning line signal necessary to generate the post-conversion scanning line signal is selectively outputted from the plurality of line memories irrespective of relations among the set speeds and timings for signal inputting and signal outputting.

According to the present invention, the scanning-line selective outputting means selectively outputs the scanning line signal necessary to generate the post-conversion scanning line from the plurality of line memories for storing the original video signal on a scanning-line basis. The scanning line interpolation means multiplies the scanning line signal selectively outputted by the interpolation coefficient and adds up the results of multiplications to generate the post-conversion scanning line signal. In this case, the scanning-line selective outputting means is constituted such that respective speeds and timings for signal inputting and signal outputting are independently set and that the scanning line signal necessary to generate the post-conversion scanning line signal is selectively outputted from the plurality of line memories, irrespective of the relations between the speeds and timings set for signal inputting and signal outputting. Consequently, even when the scanning line selective outputting means arbitrarily sets the speeds and timings for signal inputting and signal outputting to properly convert the number of scanning lines at an arbitrary conversion ratio, the scanning lines signal necessary to generate the post-conversion scanning line signal can steadily be outputted selectively from the plurality of line memories. As a result, the number of scanning lines can be converted properly at various conversion ratios.

The present invention also provides a scanning line converting circuit for converting the number of scanning lines for a video signal and a system for scanning the video signal, comprising: scanning-line selective outputting means for selecting, from scanning line signals composing an original video signal, at least one necessary to generate a post-conversion scanning line signal and outputting the selected scanning line signal; and scanning line interpolating means having interpolation coefficient generating means for generating an interpolation coefficient based on a predetermined scanning line conversion ratio, the scanning line interpolating means multiplying the scanning line signal selectively outputted from the scanning-line selective outputting means by the interpolation coefficient generated from the interpolation coefficient generating means and adding up the results of multiplication to generate the post-conversion scanning line signal, the interpolation coefficient generating means being so constituted as to generate, when the system for scanning the video signal is converted from interlaced scanning to sequential scanning or from sequential scanning to interlaced scanning, an interpolation coefficient in accordance with each field in interlaced scanning such that the post-conversion video signal does not form a blurred image.

Preferably, the interpolation coefficient generating means generates, when the predetermined scanning line conversion ratio is x:y, $(1-K/y)$ and $(K/y)$ as respective interpolation coefficients for the chronologically anterior one and the chronologically posterior one of two scanning line signals necessary to generate the post-conversion scanning line signal (where $K=(LN \times x)\%y$ is satisfied, LN is a number assigned to the post-conversion scanning line signal, z is an offset value set in accordance with each field in interlaced scanning, and % is remainder calculation).

BRIEF DESCRIPTION OF THE DRAWINGS

FIGS. 5(a) to 5(g) are timing charts illustrating the operation of the scanning line converting circuit according to the first embodiment when the number of scanning lines is converted at a conversion ratio of 19:16;

FIG. 6 shows the placement of scanning lines and an interpolation coefficient in the case of converting the number of scanning lines at a conversion ratio of 19:16;

FIGS. 7(a) to 7(c) show respective transitions (part 1) of write and read addresses in the first to third line memories 12 to 14 of the scanning line converting circuit according to the first embodiment when the number of scanning lines is converted at a conversion ratio of 19:16;

FIGS. 8(a) to 8(c) show the respective transitions (part 2) of write and read addresses in the first to third line memories 12 to 14 of the scanning line converting circuit according to the first embodiment when the number of scanning lines is converted at a conversion ratio of 19:16;

FIGS. 9(a) to 9(g) are timing charts (part 1) illustrating the operation of the scanning line converting circuit according to the first embodiment when the number of scanning lines is converted at a conversion ratio of 19:16;

FIGS. 10(a) to 10(g) are timing charts (part 2) illustrating the operation of the scanning line converting circuit according to the first embodiment when the number of scanning lines is converted at a conversion ratio of 19:16;

FIGS. 22(a) to 22(c) show display modes when a video signal for which the number of scanning lines has been converted is displayed on a display panel;

FIG. 32 is a conceptual view showing the placement and importance of the scanning line converting circuit according to the present invention.

DETAILED DESCRIPTION OF THE INVENTION

Figure 1:
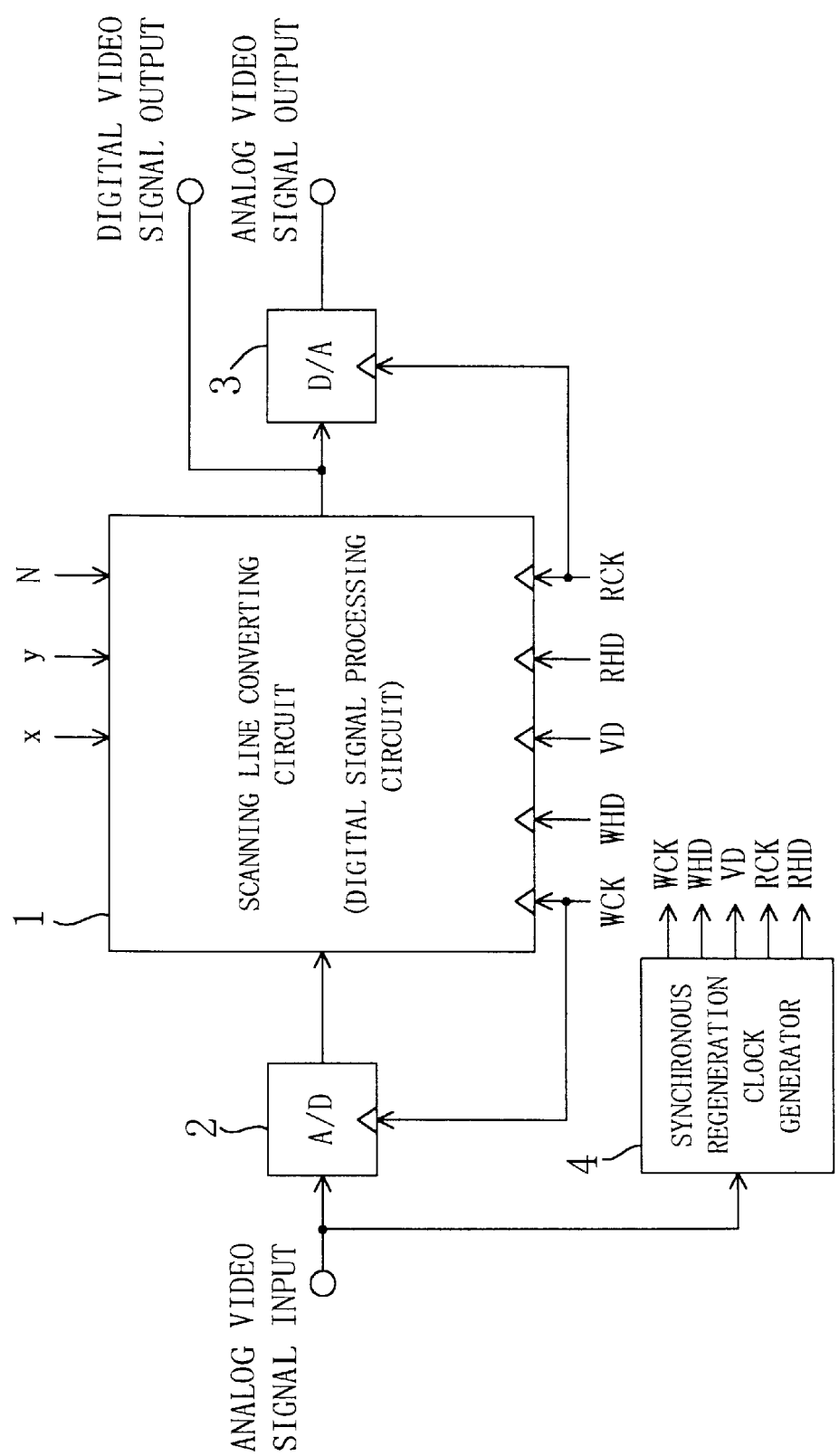
FIG. 1 shows the overall structure of a scanning line converting circuit including peripheral circuits of the present invention.

FIG. 1 shows the overall structure of a scanning line converting circuit including peripheral circuits according to the present invention. In the drawing are shown: the scanning line converting circuit 1 of the present invention; an A/D converter 2 for converting analog video signals inputted thereto to digital video signals; and a D/A converter 3 for converting, to analog video signals, the digital video signals for which the number of scanning lines has been converted by the scanning line converting circuit 1. When the ratio for converting the number of scanning lines is x:y, x and y are inputted as set values to the scanning line converting circuit 1 and the number N of line memories which operate in the scanning line converting circuit 1 is also inputted as a set value to the scanning line converting circuit 1.

There is also shown a synchronous regeneration clock generator 4, which generates a sampling clock and horizontal synchronizing signals WCK and WHD on the input side (an original video signal inputted), a sampling clock and horizontal synchronizing signals RCK and RHD on the output side (a post-conversion video signal), and a vertical synchronizing signal VD common to the input and output sides.

The clock and horizontal synchronizing signals WCK and WHD on the input side can be set independently of the setting of the clock and horizontal synchronizing signals RCK and RHD on the output side. However, if the ratio for converting the number of scanning lines is x:y, the ratio of the horizontal synchronizing frequency on the input side to the horizontal synchronizing frequency on the output side is also x:y, so that the relations represented by the following equations (1) are generally established:

$$fWCK:fRCK=fWHD:fRHD=x:y \qquad (1)$$

where fA represents the frequency of a signal A.

First Embodiment

Referring now to FIGS. 2 to 13 and Table 1, a first embodiment of the present invention will be described.

Figure 2:
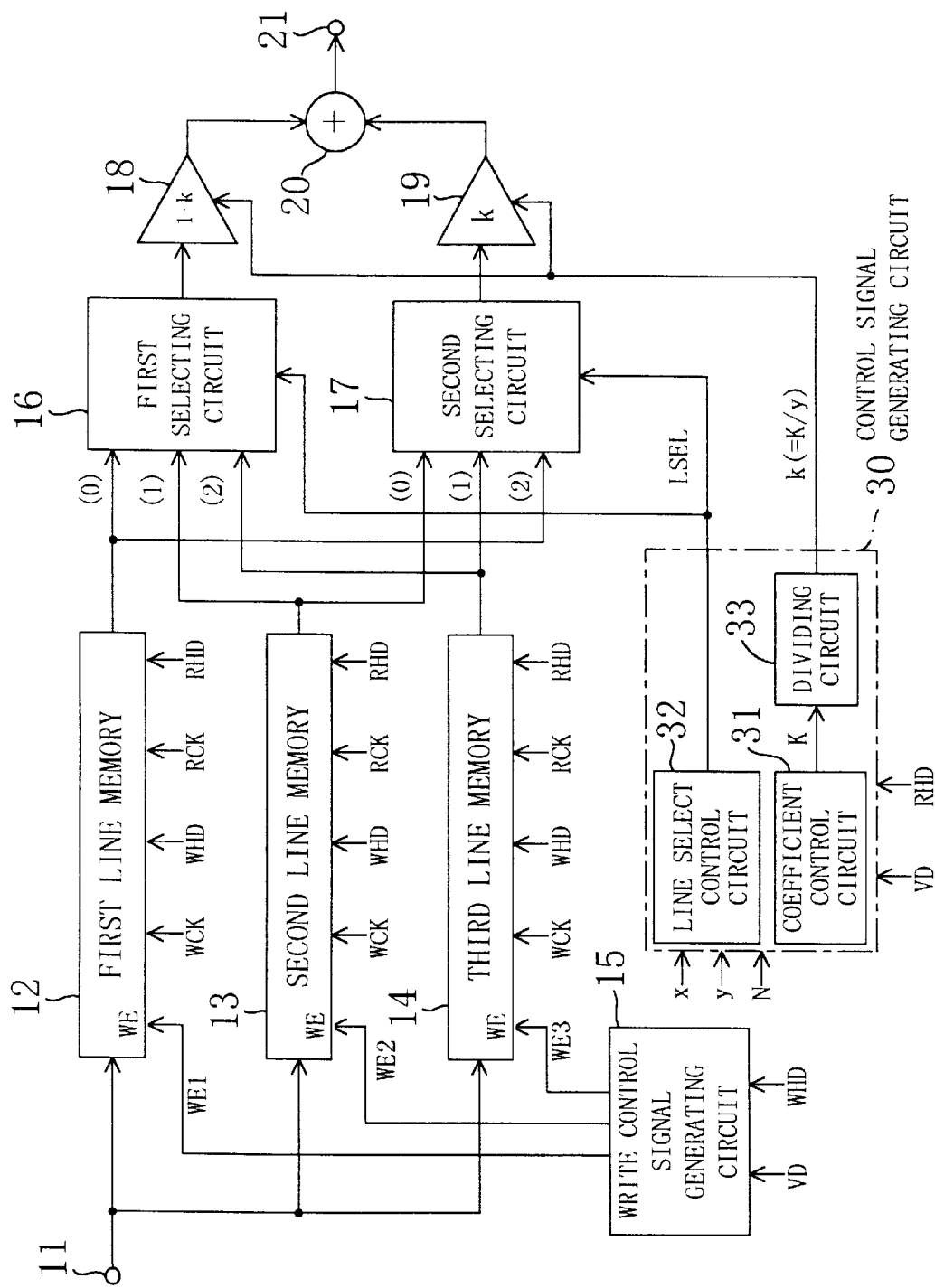
FIG. 2 is a block diagram showing the structure of a scanning line converting circuit according to a first embodiment of the present invention.

FIG. 2 is a block diagram showing the structure of a scanning line converting circuit according to a first embodiment of the present invention. In the drawing are shown: an input terminal 11 for receiving an original video signal; first to third line memories 12 to 14 each connected to the input terminal 11 to store a video signal representing one horizontal scanning line and: composing the original video signal inputted to the input terminal 11 such that write and read operations to the first to third line memories 12 to 14 are controlled independently and asynchronously; a write control signal generating circuit 15 for generating write control signals WE1 to WE3 for controlling write operations to the first to third line memories 12 to 14; first and second selecting circuits 16 and 17 each for selecting at least one from output signals from the first to third line memories 12 to 14 such that the selected signal represents one scanning line necessary to generate a post-conversion scanning line; first and second coefficient multipliers 18 and 19 for receiving respective output signals from the first and second selecting circuits 16 and 17 to perform weighting corresponding to the placement of the post-conversion scanning line with respect to the received signals; an adder 20 for adding up respective output signals from the coefficient multipliers 18 and 19; and an output terminal 21 from which an output from the adder 20 is outputted as a post-conversion scanning line signal.

A control signal generating circuit 30 comprises: a coefficient control circuit 31 for generating a coefficient control signal K for controlling the weight used in the weighting performed by the coefficient multipliers 18 and 19; a line select control circuit 32 for generating a line select signal LSEL for controlling the first and second selecting circuits 16 and 17; and a dividing circuit 33 for converting the coefficient control signal K to a coefficient direct signal k supplied to the coefficient multipliers 18 and 19. When the ratio for converting the number of signal lines is x:y, the dividing circuit 33 outputs, as the coefficient direct signal k, a value obtained by dividing, by y, the coefficient control signal K generated by the coefficient control circuit 31. Based on the coefficient direct signal k, the coefficient multipliers 18 and 19 multiply the respective input signals by (1−K) and k ($0 \leq k \leq 1$) as interpolation coefficients.

The sampling clock WCK and the horizontal synchronizing signal WHD for the original video signal are used as a drive clock and a reset signal for a write address counter in each of the first to third line memories 12 to 14. Likewise, the sampling clock RCK and the horizontal synchronizing signal RHD for the post-conversion video signal are used as a drive clock and a reset signal for a read address counter in each of the first to third line memories 12 to 14.

The first to third line memories 12 to 14, the write control signal generating circuit 15, the first and second selecting circuits 16 and 17, and the line select control circuit 32 compose scanning-line selective outputting means. The first and second coefficient multipliers 18 and 19, the adder 20, the coefficient control circuit 31, and the dividing circuit 33 compose scanning line interpolating means. The coefficient control circuit 31 and the dividing circuit 33 compose interpolation coefficient generating means. The write control signal generating circuit 15 composes write control means. The first and second selecting circuits 16 and 17 compose selecting means. The line select control circuit 32 composes select control means.

The operation of the scanning line converting circuit thus constituted according to the first embodiment will be described. As an example of conversion of the number of scanning lines, the description will be given first to the operation of the scanning line converting circuit with reference to FIGS. 3 to 5 in the case where an NTSC signal is converted to a HDTV signal, i.e., where the ratio for converting the number of scanning lines is 7:15.

Figure 3:
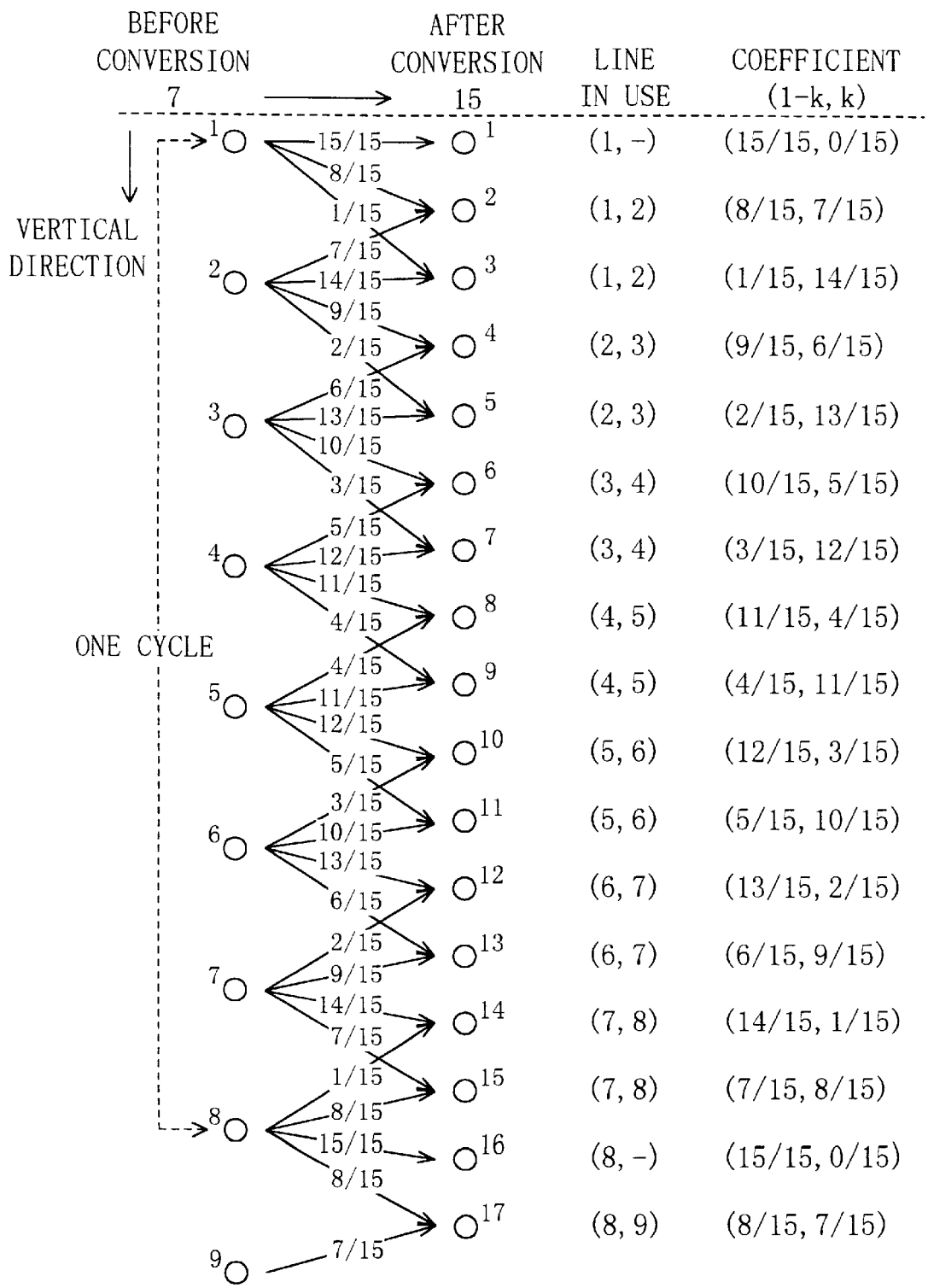
FIG. 3 shows the placement of scanning lines and an interpolation coefficient when the number of scanning lines is converted at a conversion ratio of 7:15.

FIG. 3 shows the placement of scanning lines and an interpolation coefficient when the number of scanning lines is converted at a ratio of 7:15. The interpolation method illustrated in FIG. 3 is linear interpolation using two of the scanning lines for the original video signal. As shown in FIG. 3, the first post-conversion scanning line is generated by, e.g., multiplying the first pre-conversion scanning line by a coefficient of 15/15. The second post-conversion scanning line is generated by adding up a value obtained by multiplying the first pre-conversion scanning line by a coefficient of 8/15 and a value obtained by multiplying the second pre-conversion scanning line by a coefficient of 7/15. It is to be noted that LINE IN USE shown in FIG. 3 designates the pre-conversion scanning line number used to generate the post-conversion scanning line.

In the scanning line converting circuit shown in FIG. 2 according to the present embodiment, an input terminal 11 receives an original video signal before scanning line conversion, which is supplied to each of the first to third line memories 12 to 14. The first to third line memories 12 to 14 have been supplied with the respective write control signals WE1, WE2, and WE3 and the original video signal is written, on a scanning-line basis, in each of the first to third line memories 12 to 14 under the control of the write control signals WE1, WE2, and WE3.

Figures 4A, 4B, 4C:
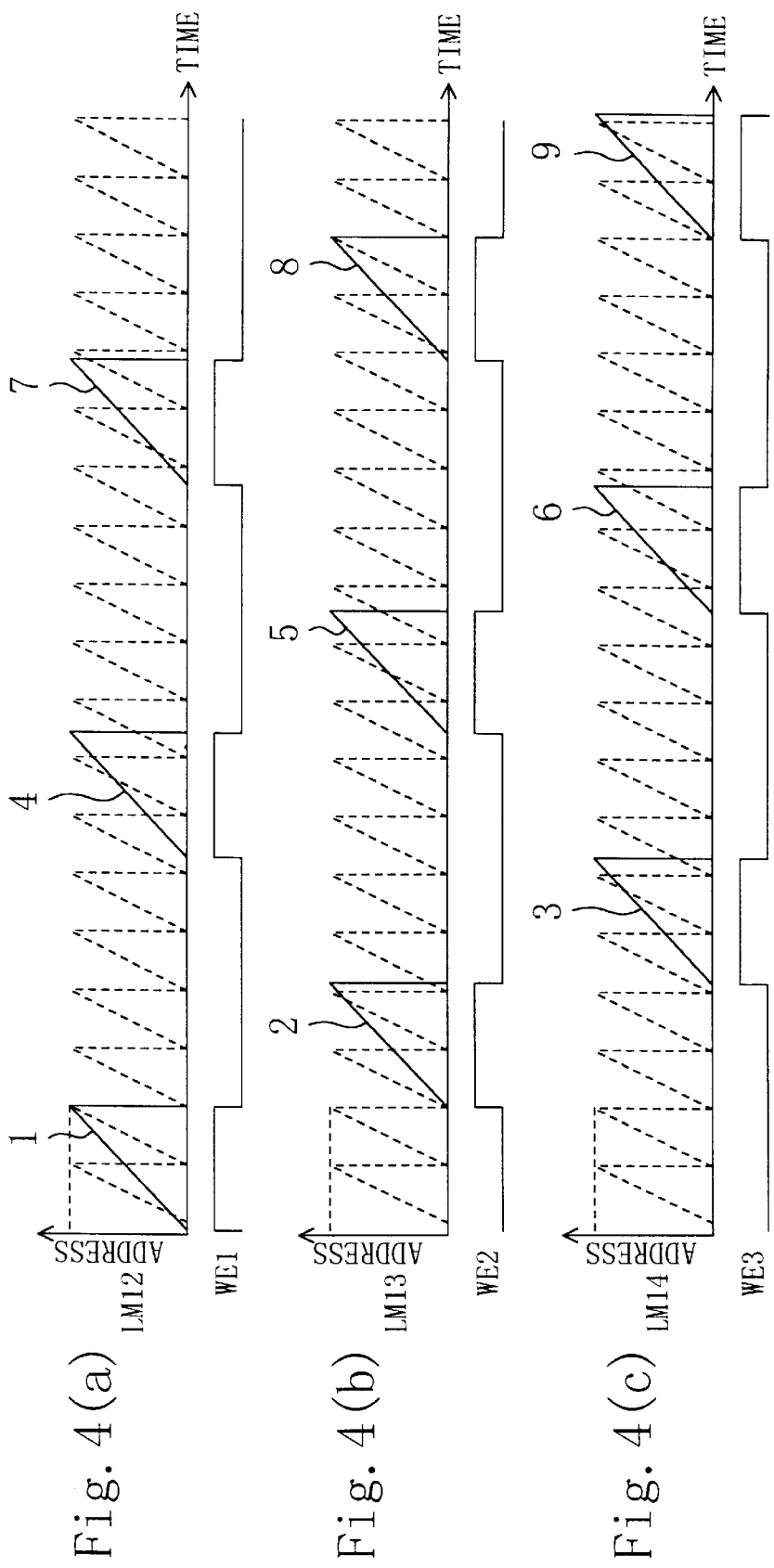
FIGS. 4(a) to 4(c) show respective transitions of write and read addresses in first to third line memories 12 to 14 of the scanning line converting circuit according to the first embodiment when the number of scanning lines is converted at a conversion ratio of 7:15.

FIGS. 4(a) to 4(c) show respective transitions of write and read addresses in the first to third line memories (LM) 12 to 14. In the drawings, the solid lines indicate write addresses and the broken lines indicate read addresses. The numerical characters accompanying the solid lines indicative of write addresses designate numbers assigned to scanning line signals to be written in the line memories. It is assumed here that the write control signals WE1, WE2, and WE3 on the HIGH level enable write operations to the first to third line memories 12 to 14 and that the write control signals WE1, WE2, and WE2 on the LOW level disable write operations to the first to third line memories 12 to 14.

As shown in FIG. 4(a), only the 1st, 4th, 7th, . . . , (3n+1)-th (n is an integer) scanning lines for the original video signal are written in the first line memory 12 under the control of the write control signal WE1. Likewise, as shown in FIGS. 4(b) and 4(c), only the 2nd, 5th, 8th, . . . , (3n+2)-th (n is an integer) scanning lines for the original video signal are written in the second line memory 13 and only the 3rd, 6th, 9th, . . . , 3n-th (n is an integer) scanning lines for the original video signal are written in the third line memory 14. On the other hand, the reading of the signals stored in the first to third line memories 12 to 14 is carried out sequentially and with the same timing in a cycle which is 7/15 of the cycle of the write operations.

The numbers assigned to the scanning line signals thus read from the first to third line memories 12 to 14 are shown in FIGS. 5(a) to 5(c). In the drawings, "NG" indicates the case where a read address outstrips a write address during a read operation and therefore the same-numbered scanning line signal cannot be read in the read operation. In this case, the read signal is not appropriate for a scanning line signal and becomes invalid.

As shown in FIG. 2, output signals from the first to third line memories 12 to 14 are inputted to each of the selecting circuits 16 and 17. In FIG. 2, the numeric characters inside the parentheses accompanying the signal lines connecting the first to third line memories 12 to 14 to the first and second selecting circuits 16 and 17 indicate the values of the line select signals LSEL when the signal lines are selected. Specifically, the first selecting circuit 16 selects the first line memory 12 when the line select signal LSEL is (0), the second line memory 13 when LSEL is (1), and the third line memory 14 when LSEL is (2). On the other hand, the second selecting circuit 17 selects the second line memory 13 when the line select signal LSEL is (0), the third line memory 14 when LSEL is (1), and the first line memory 12 when LSEL is (2).

FIG. 5(d) shows the transition of the line select signal LSEL generated from the control signal generating circuit 30. Based on the line select signal LSEL shown in FIG. 5(d), the first and second selecting circuits 16 and 17 select the hatched ones of the output signals from the first to third line memories 12 to 14 shown in FIG. 5(a) to 5(c). FIGS. 5(e) and 5(f) show scanning line signals consequently outputted from the first and second selecting circuits 16 and 17, which coincide with the lines in use shown in FIG. 3, i.e., the numbers assigned to the scanning lines for the original video signal used to generate post-conversion scanning lines.

The output signals from the first and second selecting circuits 16 and 17 are inputted to the first and second coefficient multipliers 18 and 19, respectively. The coefficient control signal K (=15×coefficient direct signal k) has values as shown in FIG. 5(g) such that the first and second coefficient multipliers 18 and 19 operate based on the coefficients as shown in FIG. 3. The first and second coefficients 18 and 19 have their gains adjusted to be (1−K) and k (k varies from one scanning line to another as shown in FIG. 3) by the coefficient direct signal k. The respective output signals from the coefficient multipliers 18 and 19 are added up by the adder 20 and the sum is outputted from the output terminal 21 as a post-conversion scanning line signal.

In this manner, conversion of the number of scanning lines at a conversion ratio of 7:15 is accomplished by using the structure shown in FIG. 2.

As another example of conversion of the number of scanning lines, the description will be given to the operation of the scanning line converting circuit shown in FIG. 2 according to the present embodiment with reference to FIGS. 6 to 10 in the case of given down conversion, i.e., in the case where the ratio for converting the number of scanning lines is 19:16.

FIG. 6 shows the placement of scanning lines and an interpolation coefficient when the number of scanning lines is converted at a ratio of 19:16. In FIG. 6, the method of interpolating the number of scanning lines is linear interpolation using two of the scanning lines for the original video signal, similarly to FIG. 3. The terminology and values used in FIG. 6 have the same denotations as in FIG. 3. FIGS. 7 and 8 show respective transitions of write and read addresses in the first to third line memories (LM) 12 to 14 when the number of scanning lines is converted at a ratio of 19:16. FIG. 9 and 10 are timing charts illustrating the operation of the scanning line converting circuit according to the present embodiment when the number of scanning lines is converted at a ratio of 19:16. FIGS. 7 and 8 are continuous in time sequence. FIGS. 9 and 10 are continuous in time sequence. The values and graphs shown in the drawings have the same denotations as in the foregoing example of conversion.

As shown in FIGS. 7 and 8, the present example of conversion is the same as the foregoing example of conversion in that the original video signal is written in one of the first to third line memories 12 to 14 on a scanning-line basis. The present example of conversion is different from the foregoing example of conversion in that the signals are read in a cycle which is 19/16 of the cycle of the write operations, since the ratio for converting the number of signal lines is 19:16. Accordingly, the speed at which the read address is incremented is lower than the speed at which the write address is incremented. Hence, the output signals from the first to third line memories become improper for scanning line signals and hence invalid only when a read address is outstripped by a write address during a read operation.

If the line select signal LSEL is controlled as shown in FIGS. 9(d) and 10(d) relative to the output signals from the first to line memories 12 to 14 as shown in FIG. 9(a) to 9(c) and FIGS. 10(a) to 10(c), the first and second selecting circuits 16 and 17 output the scanning line signals as shown in FIGS. 9(e) and 9(f) and FIGS. 10(e) and 10(f), which are coincident with the lines in use shown in FIG. 6, i.e., the numbers assigned to the scanning lines for the original video signal used to generate the post-conversion scanning lines.

The output signals from the first and second selecting circuits 16 and 17 are inputted to the first and second coefficient multipliers 18 and 19, respectively. The first and second coefficient multipliers 18 and 19 have their gains controlled to be (1−K) and k (k varies from one scanning line to another as shown in FIG. 6) responsive to the coefficient control signal K as shown in FIGS. 9(g) and 10(g). The respective output signals from the first and second coefficient multipliers 18 and 19 are added up by the adder 20 and the sum is outputted from the output terminal 21 as the post-conversion scanning line signal.

As described above, by using the structure shown in FIG. 2, the number of scanning lines can be converted properly even in the case of given down conversion using a conversion ratio of 19:16. The number of scanning lines can similarly be converted at another conversion ratio.

The present embodiment is characterized in that the control signal generating circuit 30 is capable of generating the coefficient control signal K and the line select signal LSEL based on a conversion ratio arbitrarily set so as to convert the number of signal lines at the conversion ratio.

Table 1 shows relations among the post-conversion scanning line numbers LN, the line select signals LSEL, and the coefficient control signals K at the two conversion ratios described above. It is to be noted that, in Table 1, the post-conversion scanning line numbers LN start at "0" for the sake of convenience.

TABLE 1

| Post-Conversion Scanning Line | Conversion Ratio x:y = 7:15 | | Conversion Ratio x:y = 19:16 | |
|---|---|---|---|---|
| Number LN | LSEL | K | LSEL | K |
| 0 | 0 | 0 | 0 | 0 |
| 1 | 0 | 7 | 1 | 3 |

TABLE 1-continued

| Post-Conversion Scanning Line | Conversion Ratio x:y = 7:15 | | Conversion Ratio x:y = 19:16 | |
|---|---|---|---|---|
| Number LN | LSEL | K | LSEL | K |
| 2 | 0 | 14 | 2 | 6 |
| 3 | 1 | 6 | 0 | 9 |
| 4 | 1 | 13 | 1 | 12 |
| 5 | 2 | 5 | 2 | 15 |
| 6 | 2 | 12 | 1 | 2 |
| 7 | 0 | 4 | 2 | 5 |
| 8 | 0 | 11 | 0 | 8 |
| 9 | 1 | 3 | 1 | 11 |
| 10 | 1 | 10 | 2 | 14 |
| 11 | 2 | 2 | 1 | 1 |
| 12 | 2 | 9 | 2 | 4 |
| 13 | 0 | 1 | 0 | 7 |
| 14 | 0 | 8 | 1 | 10 |
| 15 | 1 | 0 | 2 | 13 |
| 16 | 1 | 7 | 1 | 0 |
| 17 | 1 | 14 | 2 | 3 |
| 18 | 2 | 6 | 0 | 6 |
| 19 | 2 | 13 | 1 | 9 |
| ∣ | ∣ | ∣ | ∣ | ∣ |

Based on the relations shown in Table 1, the present inventors have found that the coefficient control signal K, the line select signal LSEL, the conversion ratio x:y, and the number N of line memories have relations represented by the following equations (2) and (3):

$$K = (LN*x)\%y \quad (2)$$

$$LSEL = (LN*x/y)\%N \quad (3)$$

where * represents multiplication, / represents division, and % represents remainder calculation.

Based on the following relations, the coefficient control circuit 31 capable of generating the coefficient control signal K and the line select control circuit 32 capable of generating the line select signal LSEL can simply be constituted based on the conversion ratio arbitrarily set. By way of example, a description will be given to the coefficient control circuit 31 and the line select control circuit 32 each composed only of hardware logic circuits without using a memory or CPU.

Figure 11:
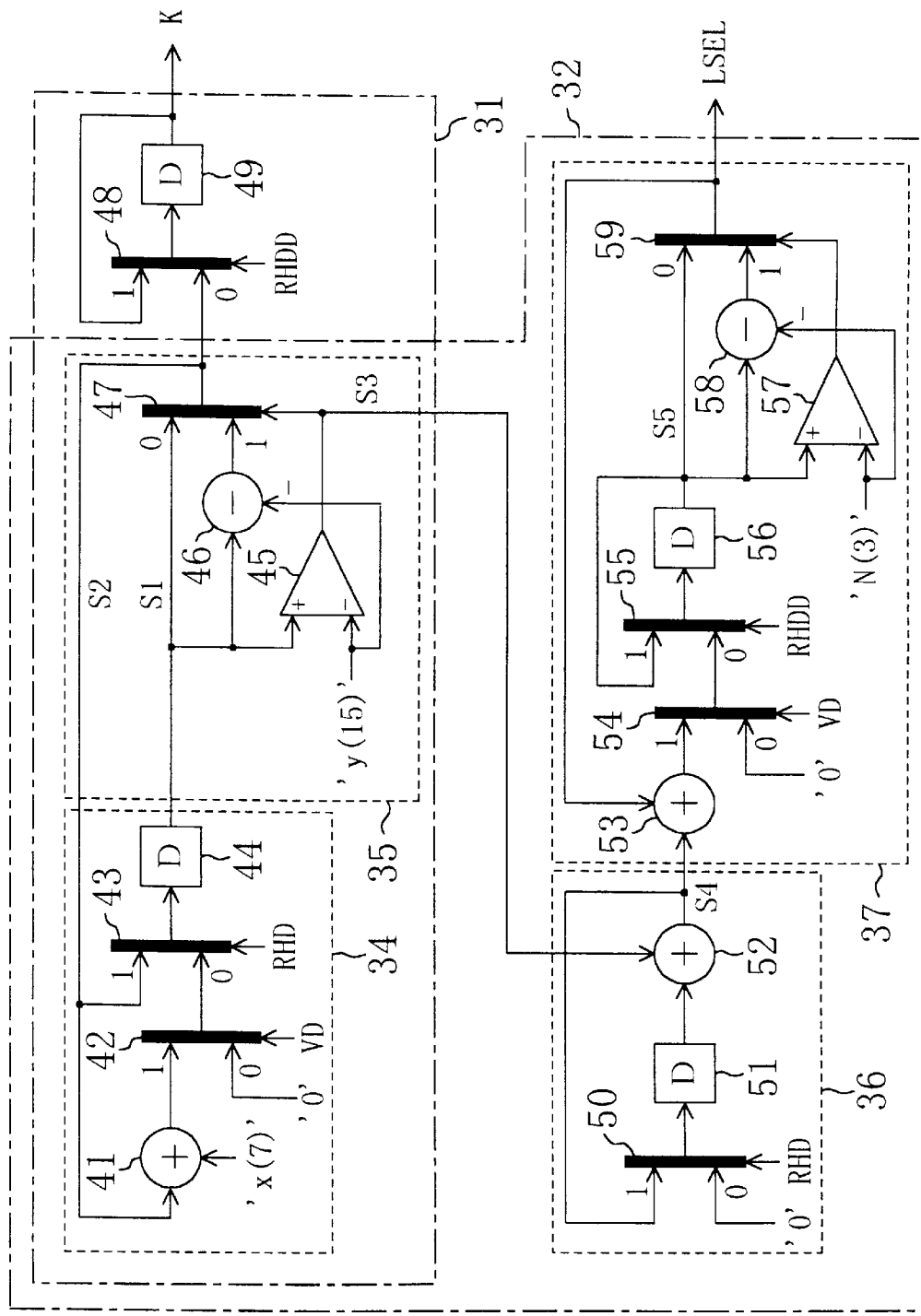
FIG. 11 is a block diagram showing the structures of a coefficient control circuit 31 and of a line select control circuit 32 according to the first embodiment of the present invention.

FIG. 11 is a block diagram showing the structures of the coefficient control circuit 31 and of the line select control circuit 32 according to the present embodiment constituted based on the foregoing relations. The coefficient control circuit 31 and the line select control circuit 32 shown in FIG. 11 generates the line select signal LSEL and the coefficient control signal K when the ratio for converting the number of scanning lines is x:y (x and y are arbitrary natural numbers) and N line memories are provided.

In FIG. 11 are shown: adders 41, 52, and 53; selecting circuits 42, 43, 47, 48, 50, 54, 55, and 59; D flip-flops 44, 49, and 51; comparators 45 and 57; and subtractors 46 and 58. Each of the comparators 45 and 57 outputs "1" when an input value on the plus side is equal to or higher than an input value on the minus side and outputs "1" in the other cases. The D flip-flops 44, 49, 51, and 56 are driven by the sampling clock RCK for a post-conversion video signal. The adder 41, the selecting circuits 42 and 43, and the D flip-flop 44 compose a first counting portion 34. The comparator 45, the subtractor 46, and the selecting circuit 47 compose a first remainder calculating portion 35. The selecting circuit 50, the D flip-flop 51, and the adder 52 compose a second counting portion 36. The adder 53, the selecting circuits 54, 55, and 59, the D flip-flop 56, the comparator 57, and the subtractor 58 compose a second remainder calculating portion 37.

In FIG. 11, the coefficient control circuit 31 and the line select control circuit 32 have partially common structures. Specifically, the coefficient control circuit 31 and the line select control circuit 32 have the first counting portion 34 and the first remainder calculating portion 35 in common. The number counted by the first counting portion 34 or an output signal S1 from the D flip-flop 44 is returned through the remainder calculating portion 35 (signal S2) and x (x=7 when the ratio for converting the number of scanning lines is 7:15) is added to the number of counts by the adder 41. The first selecting circuit 42 resets the number of counts to "0" responsive to the vertical synchronous signal VD, while the second selecting circuit 43 advances the number of counts responsive to the horizontal synchronizing signal RHD for the post-conversion video signal. In the first remainder calculating portion 35, the comparator 45 compares the output signal S1 from the D flip-flop 44 with y (y=15 when the ratio for converting the number of scanning lines is 7:15). The subtractor 46 subtracts y from the output signal S1 and selects either the signal S1 or an output signal from the subtractor 46 based on the result of comparison (signal S3) performed by the comparator 45.

In addition to the first counting portion 34 and the first remainder calculating portion 35, the coefficient control circuit 31 comprises a selecting circuit 48 for performing a select operation responsive to a signal RHDD obtained by delaying the horizontal synchronizing signal RHD on the output side by several clocks. In addition to the first counting portion 34 and the first remainder calculating portion 35, the line select control circuit 32 comprises a second counting portion 36 for counting the output signal S3 from the comparator 45 and a second remainder calculating portion 37.

Figure 12:
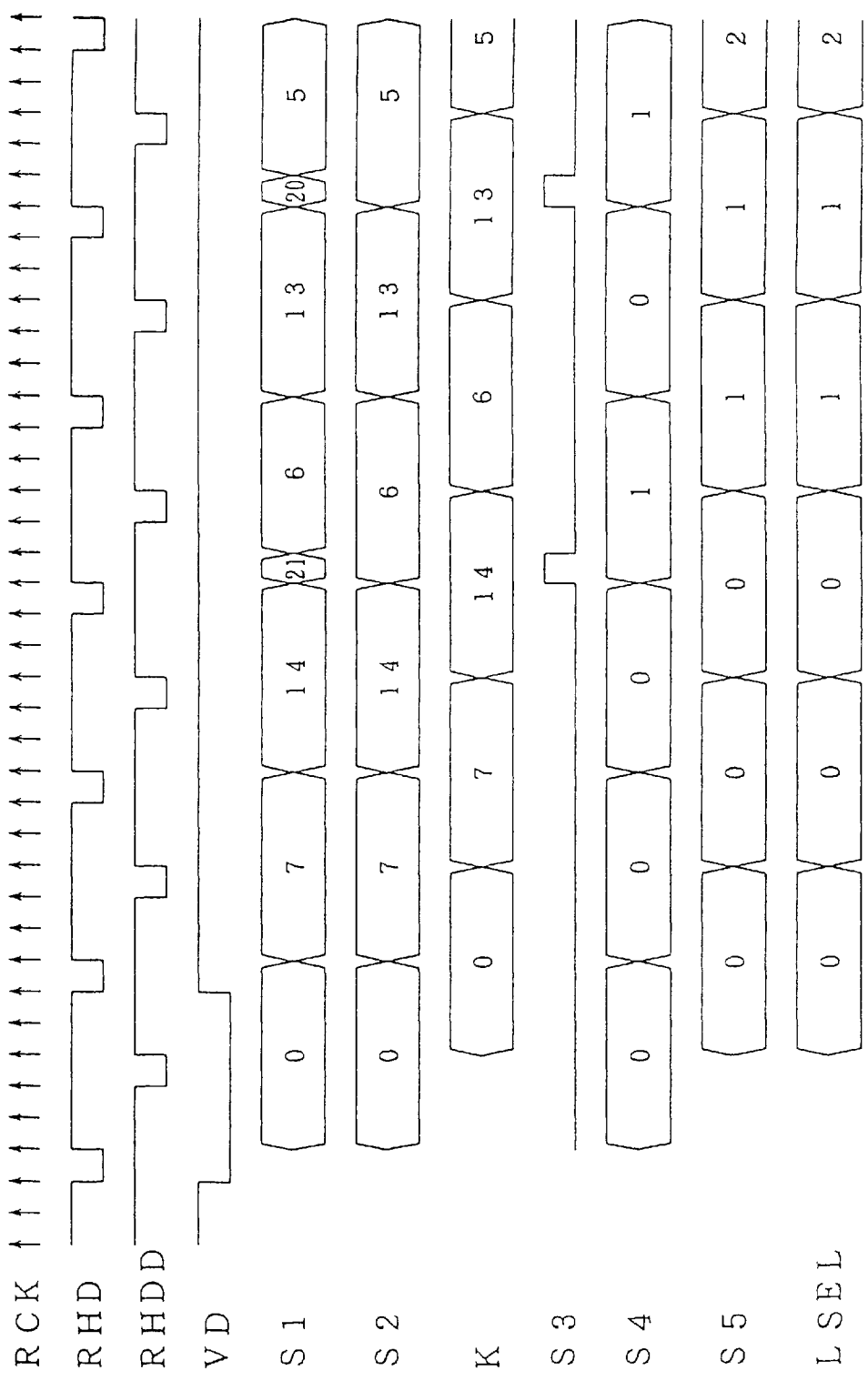
FIG. 12 is a timing chart (part 1) illustrating the operations of the coefficient control circuit 31 and line select control circuit 32 shown in FIG. 11 according to the first embodiment of the present invention when a conversion ratio x:y=7:15 and the number of line memories N=3 are satisfied.
Figure 13:
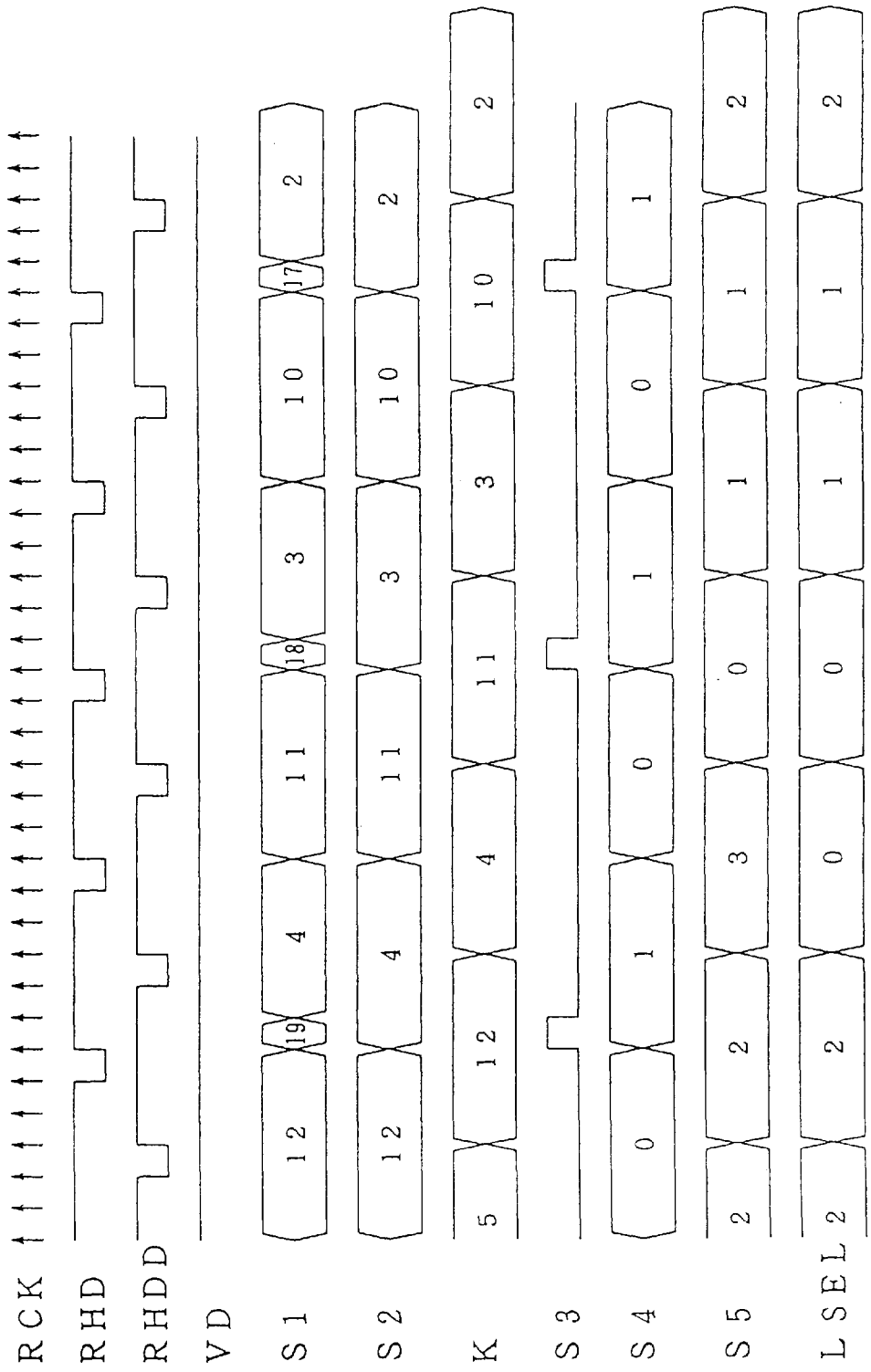
FIG. 13 is a timing chart (part 2) illustrating the operations of the coefficient control circuit 31 and line select control circuit 32 shown in FIG. 11 according to the first embodiment of the present invention when a conversion ratio x:y=7:15 and the number of line memories N=3 are satisfied.

Referring to the timing charts of FIGS. 12 and 13, a description will be given to the operations of the coefficient control circuit 31 and of the line select control circuit 32 when the ratio for converting the number of scanning lines x:y) =7:15 and the number of line memories used for conversion N=3 are satisfied. FIGS. 12 and 13 are continuous in time sequence.

As shown in FIGS. 12 and 13, the number counted by the first counting portion 34 (signal S1) is resetted to "0" when the vertical synchronizing signal VD becomes LOW. Thereafter, every time the horizontal synchronizing signal RHD becomes LOW, the gate of the selecting circuit 43 is opened, which increments the number counted by the first counting portion 34 by x, i.e., "7". When the number of counts is incremented to reach y, which is a value equal to or more than "15", the output signal S3 from the comparator 45 becomes HIGH and the selecting circuit 47 outputs a value obtained by subtracting "15" from the number of counts S1 as a signal S2. Since the signal S2 outputted from the selecting circuit 47 is transmitted through the selecting circuit 43 and the D flip-flop 44, the subtraction is recursively performed till the signal S1 reaches a value under "15". Consequently, the output signal S2 from the selecting circuit 47 has a value of the remainder when the number S1 counted by the first counting portion 33 is divided by "15". The signal S2 is newly sampled by the selecting circuit 48 with the timing of the signal RHDD lagging behind the signal RHD by several clocks. Since the signal S2 is generated by recursive subtractions, it may have a transient value immediately after a transition and the sampling is performed so that the signal S2 does not have a transient value. As a result, the coefficient control circuit 31 steadily outputs the coefficient control signal K.

The second counting portion 36 counts the number of times that the number S1 counted by the first counting portion 34 reaches "15", i.e., the number of times that the first remainder calculating portion 35 recursively subtracts "15" from the signal S1. The number of recursive subtractions is obtained by counting the number of times that the output signal S3 from the comparator 45 becomes HIGH. However, since the count operation is resetted by the horizontal synchronizing signal RHD, the output signal one scanning line before is added by the adder 53. The second remainder calculating portion 37 calculates the remainder by subtracting "3" when the signal S5 reaches N which is equal to or more than "3", similarly to the first remainder calculating portion 35. The line select control circuit 32 outputs the result of calculating the remainder from the second remainder calculating portion 37 as the line select signal LSEL. Although the second remainder calculating portion 37 is so constituted as to subtract "3" only once during the period of one horizontal scanning, it may also be so constituted as to perform recursive subtractions, similarly to the first remainder calculating portion 35.

As a result of these operations, the coefficient control signal K and the line select signal LSEL when the conversion ratio is 7:15, which are shown in Table 1, are generated as illustrated in FIGS. 12 and 13.

As described above, by using the structure shown in FIG. 11, the coefficient control signal K and the line control signal LSEL can be generated at an arbitrary ratio x:y for converting the number of scanning lines without using a memory such as a RAM or ROM.

Second Embodiment

Referring to FIGS. 14 to 21 and Tables 2 and 3, a second embodiment of the present invention will be described. The present embodiment is for converting the number of scanning lines as well as the scanning system. In the present embodiment, conversion of the scanning system indicates conversion of the scanning system from interlaced scanning to sequential scanning or vice versa.

A description will be given first to the conversion of the scanning system from interlaced scanning to sequential scanning.

Figure 14:
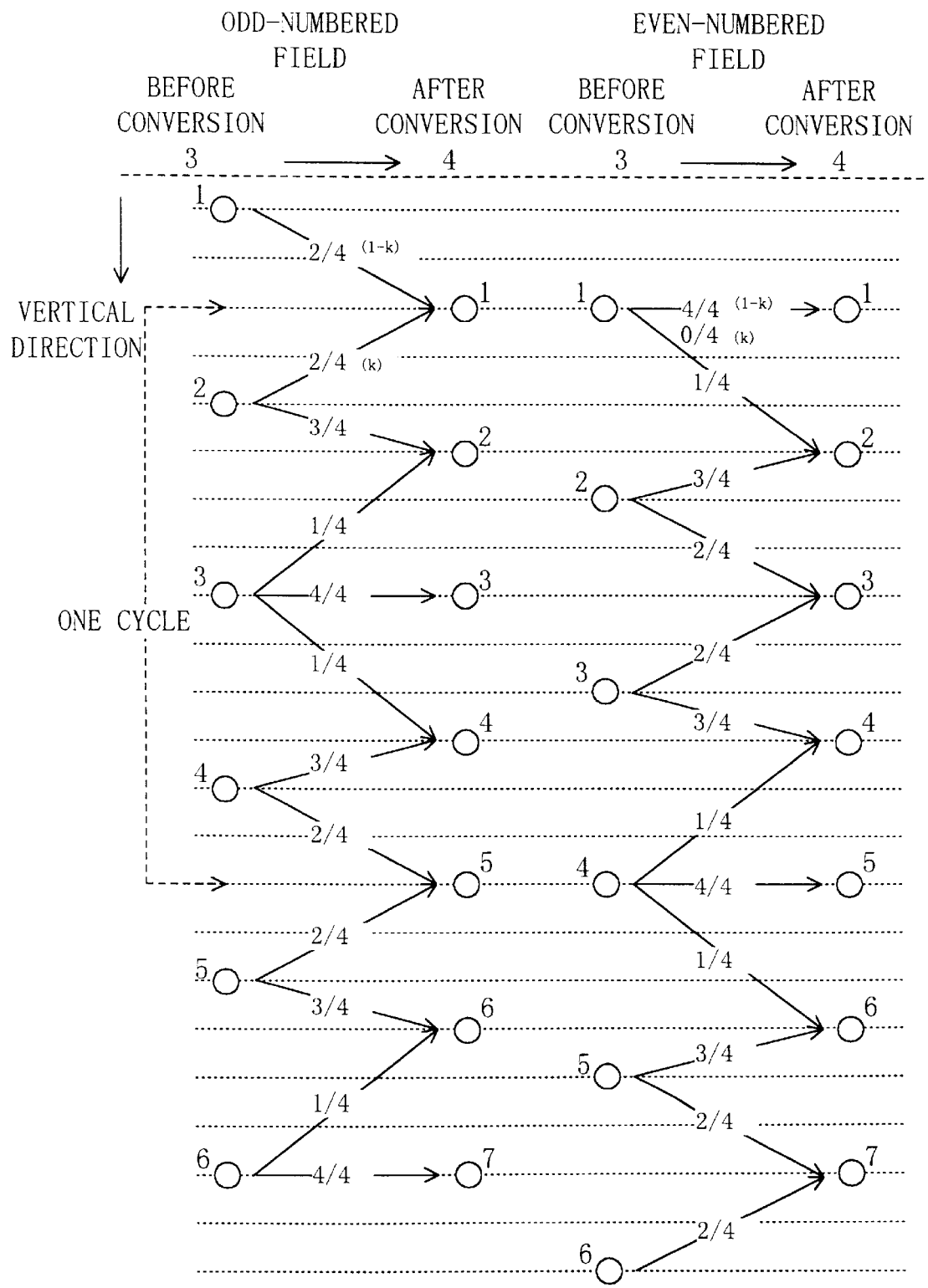
FIG. 14 shows the placement of scanning lines and an interpolation coefficient when the scanning system is converted from interlaced scanning to sequential scanning and the number of scanning lines is converted at a conversion ratio of 3:4.

FIG. 14 shows the placement of scanning lines and an interpolation coefficient when an original video signal in interlaced scanning is converted to a video signal in sequential scanning and the number of scanning lines is converted at a ratio of 3:4. As shown in the drawing, the original video signal in interlaced scanning is converted to the video signal in sequential scanning by constantly placing a post-conversion scanning line in a given position regardless of an input field.

Table 2 shows relations among the post-conversion scanning line numbers LN, the line select signals LSEL, and the coefficient control signals K when the field for the original video signal inputted is odd-numbered and even-numbered in the example of conversion shown in FIG. 14. It is to be noted that, in Table 2, the post-conversion scanning line numbers LN start at "0" for the sake of convenience.

TABLE 2

| Post-Conversion Scanning Line | ODD-NUMBERED FIELD INPUT | | EVEN-NUMBERED FIELD INPUT | |
|---|---|---|---|---|
| Number LN | LSEL | K(= k*y) | LSEL | K(= k*y) |
| 0 | 0 | 2 | 0 | 0 |
| 1 | 1 | 1 | 0 | 3 |
| 2 | 2 | 0 | 1 | 2 |
| 3 | 2 | 3 | 2 | 1 |
| 4 | 0 | 2 | 0 | 0 |
| 5 | 1 | 1 | 0 | 3 |
| 6 | 2 | 0 | 1 | 2 |
| 7 | 2 | 3 | 2 | 1 |
| 8 | 0 | 2 | 0 | 0 |
| 9 | 1 | 1 | 0 | 3 |
| 10 | 2 | 0 | 1 | 2 |
| 11 | 2 | 3 | 2 | 1 |
| 12 | 0 | 2 | 0 | 0 |
| 13 | 1 | 1 | 0 | 3 |
| 14 | 2 | 0 | 1 | 2 |
| 15 | 2 | 3 | 2 | 1 |
| 16 | 0 | 2 | 0 | 0 |
| 17 | 1 | 1 | 0 | 3 |
| 18 | 2 | 0 | 1 | 2 |
| 19 | 2 | 3 | 2 | 1 |
| | | | | |

Based on the relations shown in Table 2, the present inventors have found that the relations among the coefficient control signal K, the line select signal LSEL, the conversion ratio x:y, and the number N of line memories are represented by the following equations (4) and (5):

$$K=(LN*x+z)\%y \qquad (4)$$

$$LSEL=((LN*x+z)/y)\%N \qquad (5)$$

where * represents multiplication, / represents division, % represents remainder calculation, and z represents the offset value of the coefficient which is different from one field to another for the original video signal.

In the example of conversion shown in FIG. 14, the coefficient control signal K and the line select signal as shown in Table 2 can be generated by setting the offset value z of the coefficient to 2 when an odd-numbered field is inputted and to 0 when an even-numbered field is inputted. Consequently, interlaced scanning can be converted to sequential scanning by constantly placing the scanning line in a given position regardless of an input field, while the number of scanning lines is converted at a conversion ratio of 3:4 simultaneously. In the case of converting the scanning system from interlaced scanning to sequential scanning, if the coefficient offset value is z0 when an odd-numbered field is inputted and z1 when an even-numbered field is inputted, the following equation (6) is generally satisfied:

$$z0-z1=y/2 \qquad (6).$$

Figure 15:
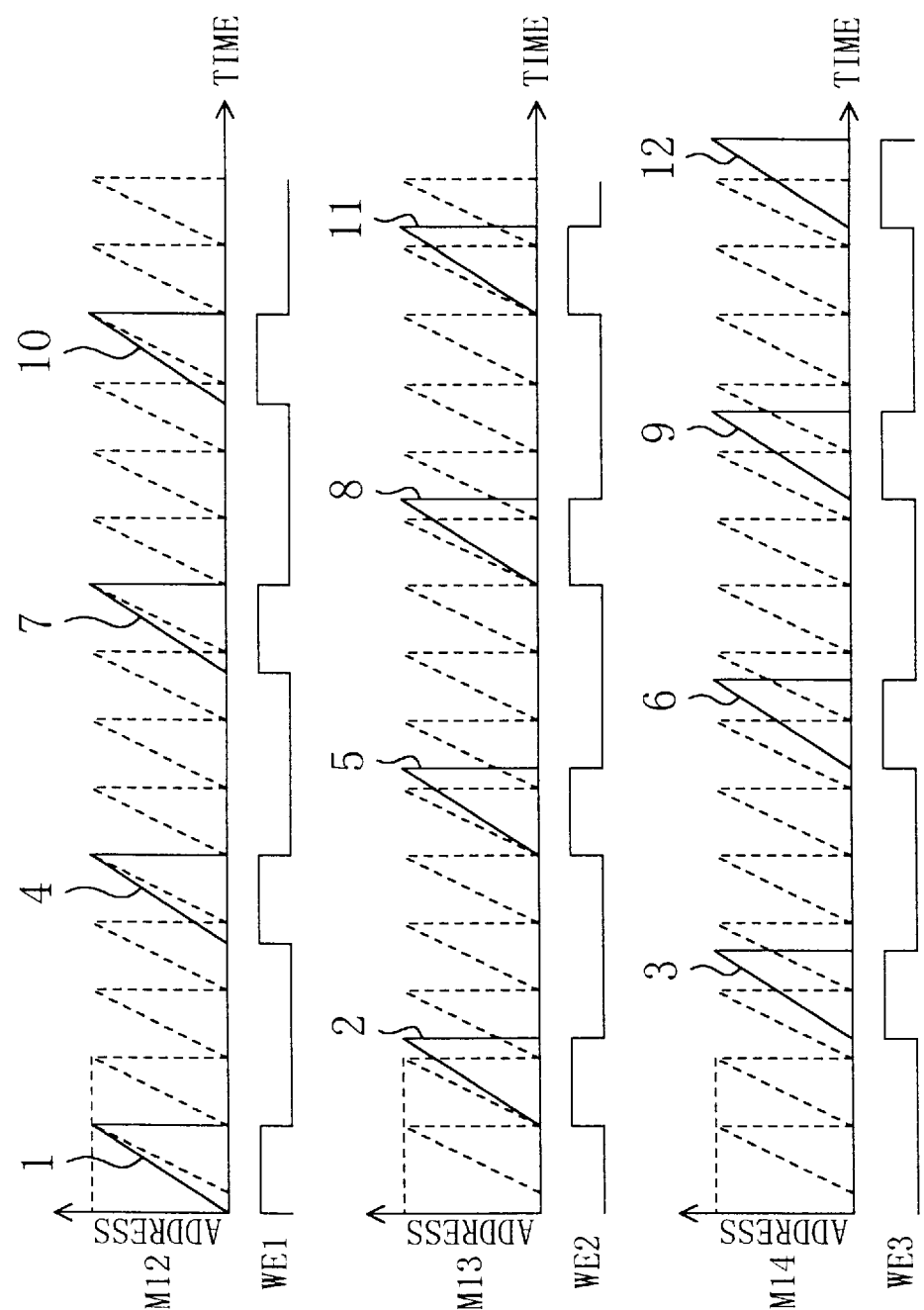
FIGS. 15(a) to 15(c) show respective transitions of write and read addresses in first to third line memories of a scanning line converting circuit according to a second embodiment when the scanning system for a vide signal is converted from interlaced scanning to sequential scanning and the number of scanning lines is converted at a conversion ratio of 3:4.
Figure 16:
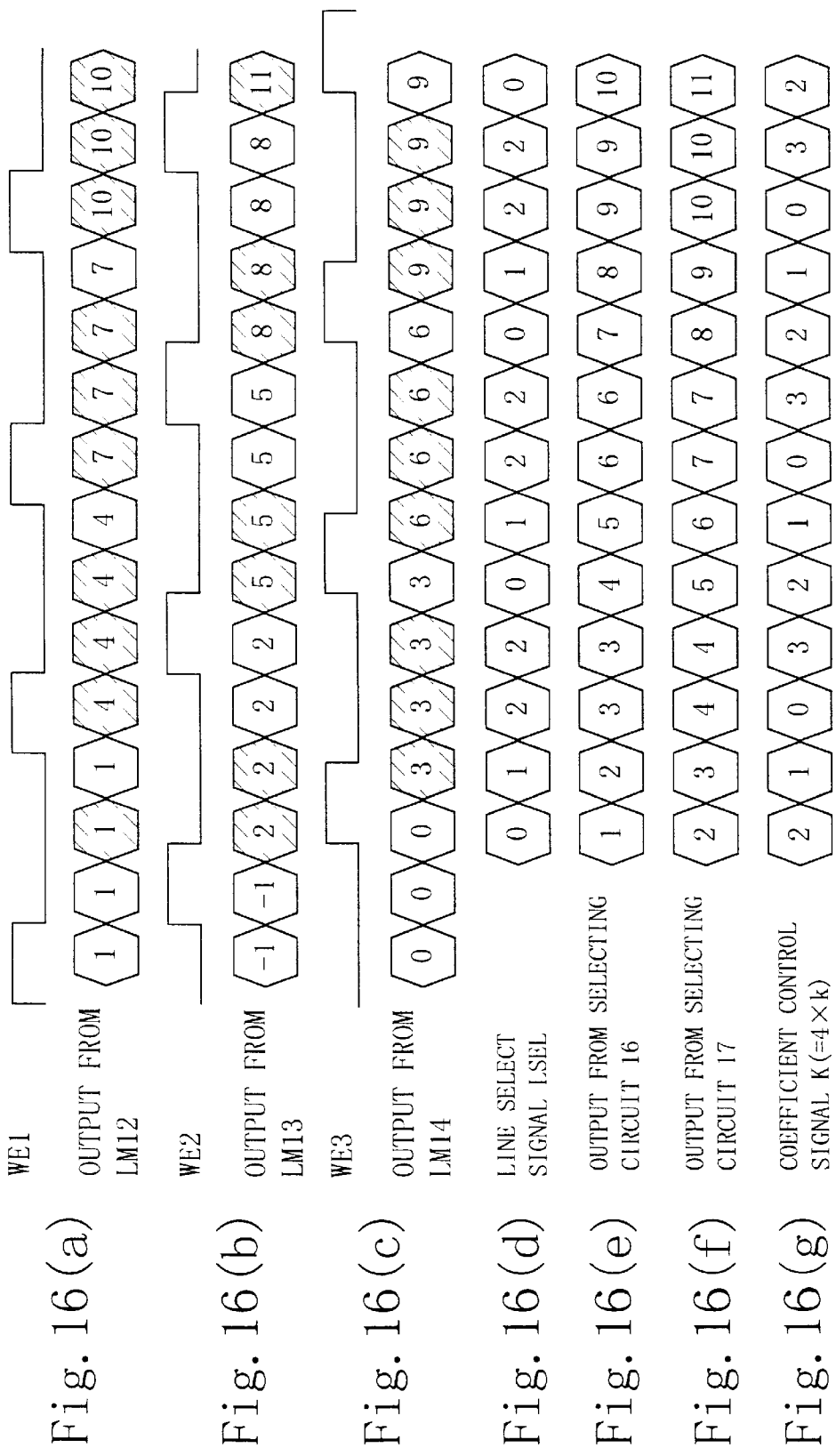
FIGS. 16(a) to 16(g) are timing charts (part 1) illustrating the operation of the scanning line converting circuit according to the second embodiment when the scanning system is converted from interlaced scanning to sequential scanning and the number of scanning lines is converted at a conversion ratio of 3:4.
Figure 17:
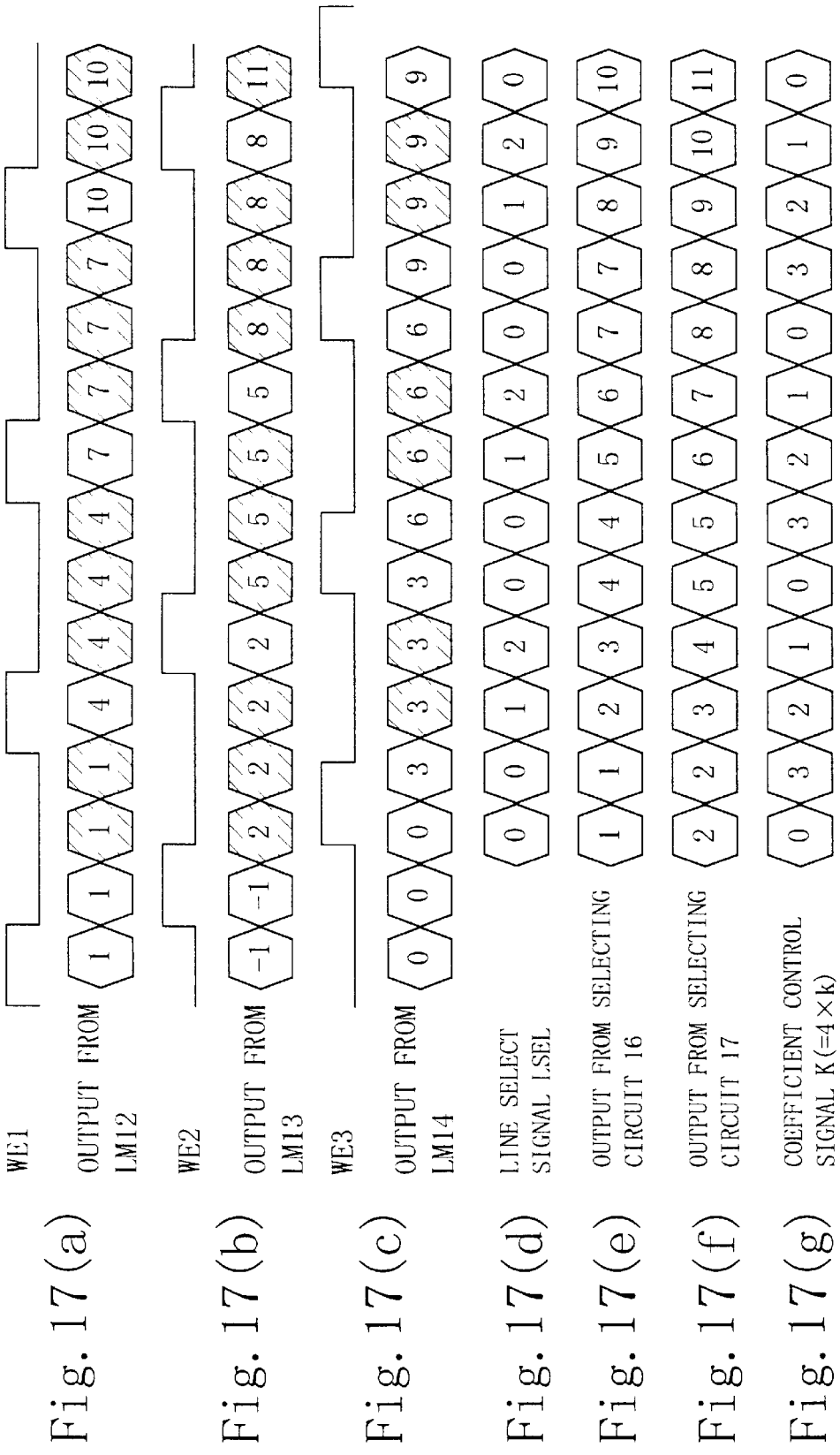
FIGS. 17(a) to 17(g) are timing charts (part 2) illustrating the operation of the scanning line converting circuit according to the second embodiment when the scanning system is converted from interlaced scanning to sequential scanning and the number of scanning lines is converted at a conversion ratio of 3:4.

FIGS. 15 to 17 are timing charts illustrating the operation of the scanning line converting circuit according to the present embodiment when the example of conversion shown in FIG. 14 is implemented. FIG. 15 shows respective transitions of write and read addresses in the line memories (LM) 12 to 14, similarly to FIG. 4 illustrating the first embodiment of the present invention. FIG. 16 shows the operation when an odd-numbered field is inputted. FIG. 17 shows the operation when an even-numbered field is inputted. FIGS. 16 and 17 show respective transitions of the outputs from the first to third line memories 12 to 14, the line select signal LSEL, the outputs from the first and second selecting circuits 16 and 17, and the coefficient control signal K with the passage of time, similarly to FIG. 5 illustrating the first embodiment.

Figure 18:
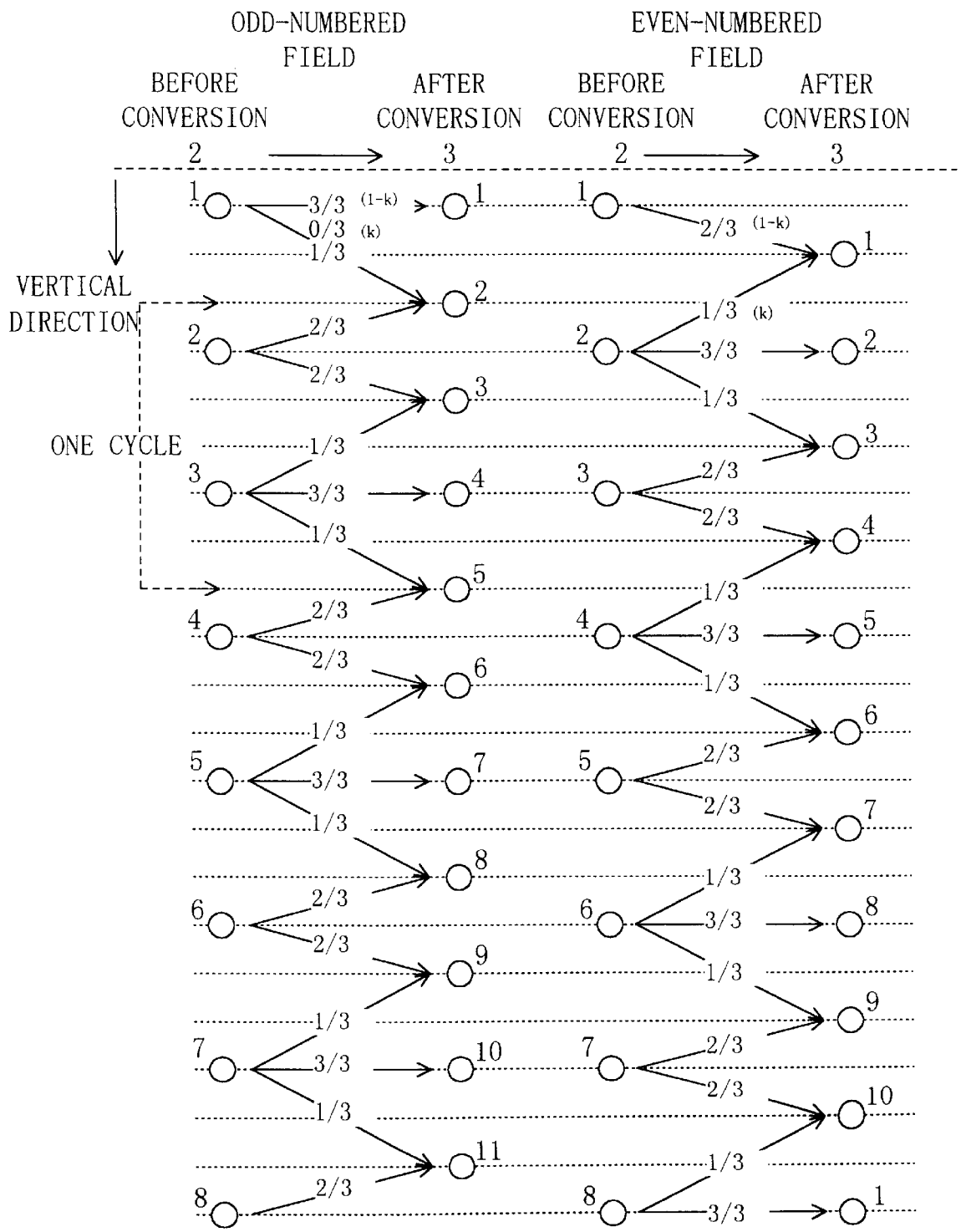
FIG. 18 shows the placement of scanning lines and an interpolation coefficient when the scanning system for a video signal is converted from sequential scanning to interlaced scanning and the number of scanning lines is converted at a conversion ratio of 2:3.

The conversion of the scanning system from sequential scanning to interlaced scanning can also be performed in the same manner. FIG. 18 shows the placement of scanning lines and an interpolation coefficient when an original video signal in sequential scanning is converted to a video signal in interlaced scanning and the number of scanning lines is converted at a ratio of 2:3. As shown in the drawing, the original video signal in sequential scanning is converted to the video signal in interlaced scanning by placing a post-conversion scanning line in different positions depending on an output field such that a scanning line in an odd-numbered field and a scanning line in an even-numbered field alternate in position.

Table 3 shows relations among the post-conversion scanning line number LN, the coefficient control signal K, and the line select signal LSEL when the field for the original video signal inputted is odd-numbered and even-numbered in the example of conversion shown in FIG. 18. It is to be noted that, in Table 3, the post-conversion scanning line number LN starts at "0" for the sake of convenience.

TABLE 3

| Post-Conversion Scanning Line | ODD-NUMBERED FIELD INPUT | | EVEN-NUMBERED FIELD INPUT | |
|---|---|---|---|---|
| Number LN | LSEL | K(= k*y) | LSEL | K(= k*y) |
| 0 | 0 | 0 | 0 | 1 |
| 1 | 0 | 2 | 1 | 0 |
| 2 | 1 | 1 | 1 | 2 |
| 3 | 2 | 0 | 2 | 1 |
| 4 | 2 | 2 | 0 | 0 |
| 5 | 0 | 1 | 0 | 2 |
| 6 | 1 | 0 | 1 | 1 |
| 7 | 1 | 2 | 2 | 0 |
| 8 | 2 | 1 | 2 | 2 |
| 9 | 0 | 0 | 0 | 1 |
| 10 | 0 | 2 | 1 | 0 |
| 11 | 1 | 1 | 1 | 2 |
| 12 | 2 | 0 | 2 | 1 |
| 13 | 2 | 2 | 0 | 0 |
| 14 | 0 | 1 | 0 | 2 |
| 15 | 1 | 0 | 1 | 1 |
| 16 | 1 | 2 | 2 | 0 |
| 17 | 2 | 1 | 2 | 2 |
| 18 | 0 | 0 | 0 | 1 |
| 19 | 0 | 2 | 1 | 0 |
| ⁞ | ⁞ | ⁞ | ⁞ | ⁞ |

Based on the relations shown in Table 3, the present inventors have found that the relations among the coefficient control signal K, the line select signal LSEL, the conversion ratio x:y, and the number N of line memories can also be satisfied by the equations (4) and (5) in the case of converting the scanning system from sequential scanning to interlaced scanning.

In the example of conversion shown in FIG. 18, the coefficient control signal K and the line select signal LSEL as shown in Table 3 can be generated by setting the offset value z of the coefficient to 0 when an odd-numbered field is outputted and to 1 when an even-numbered field is outputted. Consequently, the scanning system can be converted from sequential scanning to interlaced scanning, while the number of scanning lines is converted at a conversion ratio of 2:3 simultaneously. In the case of converting the scanning system from sequential scanning to interlaced scanning, if the coefficient offset value is set to $z0$ when an odd-numbered field is outputted and to $z1$ when an even-numbered field is outputted, the following equation (7) is generally satisfied:

$$z1-z0=x/2 \tag{7}$$

Figure 19:
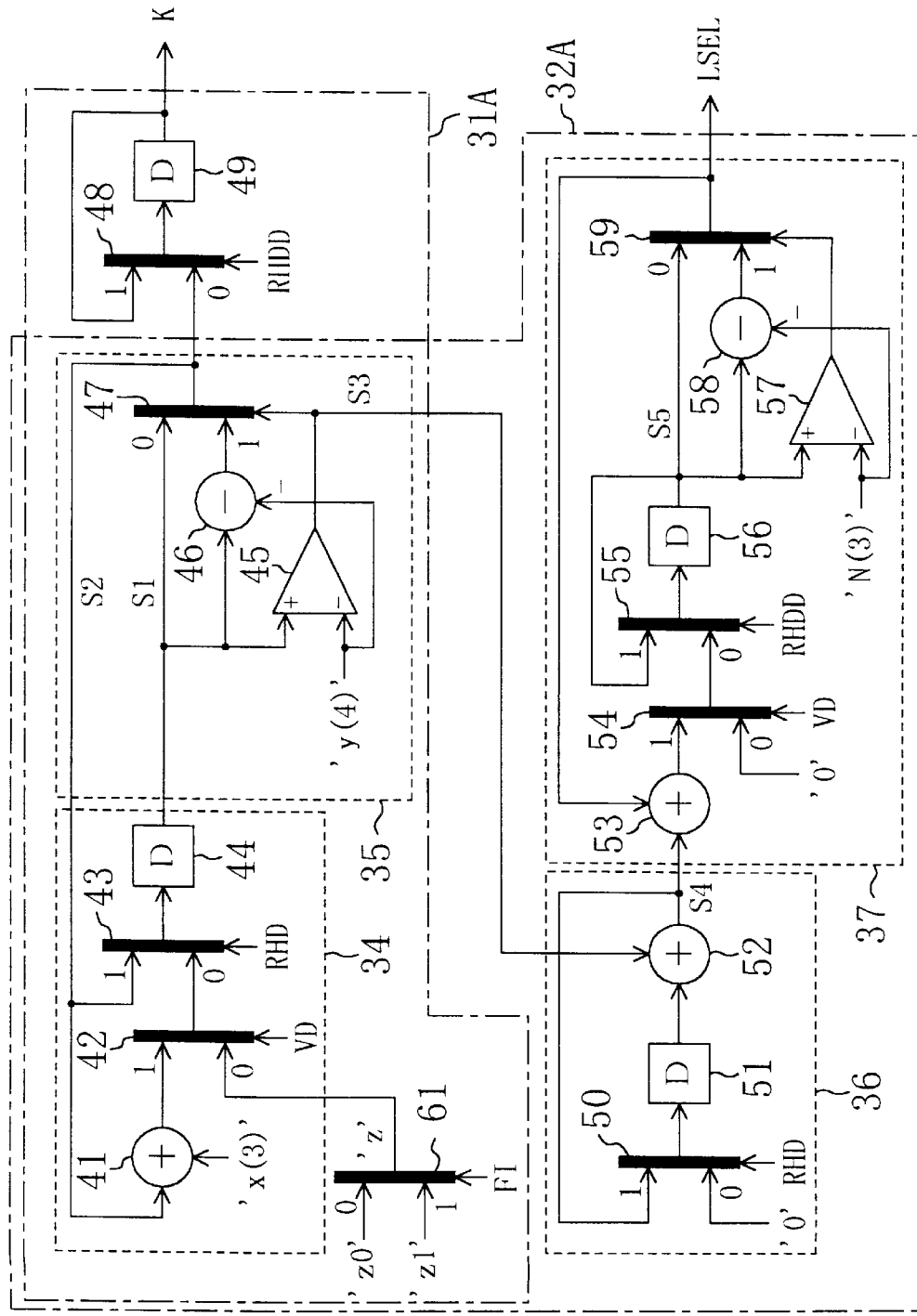
FIG. 19 is a block diagram showing the structures of a coefficient control circuit 31A and of a line select control circuit 32A according to the second embodiment of the present invention.

FIG. 19 is a block diagram showing the structures of the coefficient control circuit 31A and of the line select control circuit 32A according to the present embodiment, which has been constituted based on the foregoing relations. The coefficient control circuit 31A and the line select control circuit 32A generate the line select signal LSEL and the coefficient control signal K each for converting the number of scanning lines as well as the scanning system concurrently when the ratio for converting the number of scanning lines is x:y (x and y are arbitrary natural numbers). Specifically, the offset value $z0$ when an odd-numbered field is inputted (or outputted) and the offset value $z1$ when an even-numbered field is inputted (or outputted) are set so that either $z0$ or $z1$ is outputted as the coefficient offset value z depending on the field inputted or outputted.

A selecting circuit 61 shown in FIG. 19 selects, based on a field index pulse F1, the set value $z0$ as the offset value z when the original video signal or the post-conversion video signal represents an odd-numbered field and the set value $z1$ as the offset value z when the original video signal or the post-conversion video signal represents an even-numbered field. As for the components other than the selecting circuit 61, they are the same as those used in the coefficient control circuit 31 and the line select control circuit 32 shown in FIG. 11, so that they are designated at the same reference numerals. In addition to the first counting portion 34 and the first remainder calculating portion 35, the coefficient control circuit 31A and the line select control circuit 32A also have a selecting circuit 61 in common. The first counting portion 34 receives the offset value z outputted from the selecting circuit 61 as a reset value of the number of counts and adds the post-conversion scanning line number LN multiplied by x to the offset value z.

Based on the field index pulse F1, the selecting circuit 61 selects $z0$ as the offset value z when the original video signal or the post-conversion video signal represents an odd-numbered field and $z1$ as the offset value z when the original video signal or the post-conversion video signal represents an even-numbered field. The first counting portion 34 performs a count operation by using the offset value z as the reset value. Briefly, the first counting portion 34 performs a count operation by using $z0$ as the reset value when the original video signal or the post-conversion video signal represents an odd-numbered field and by using $z1$ as the reset value when the original video signal or the post-conversion video signal represents an even-numbered field.

Figure 20:
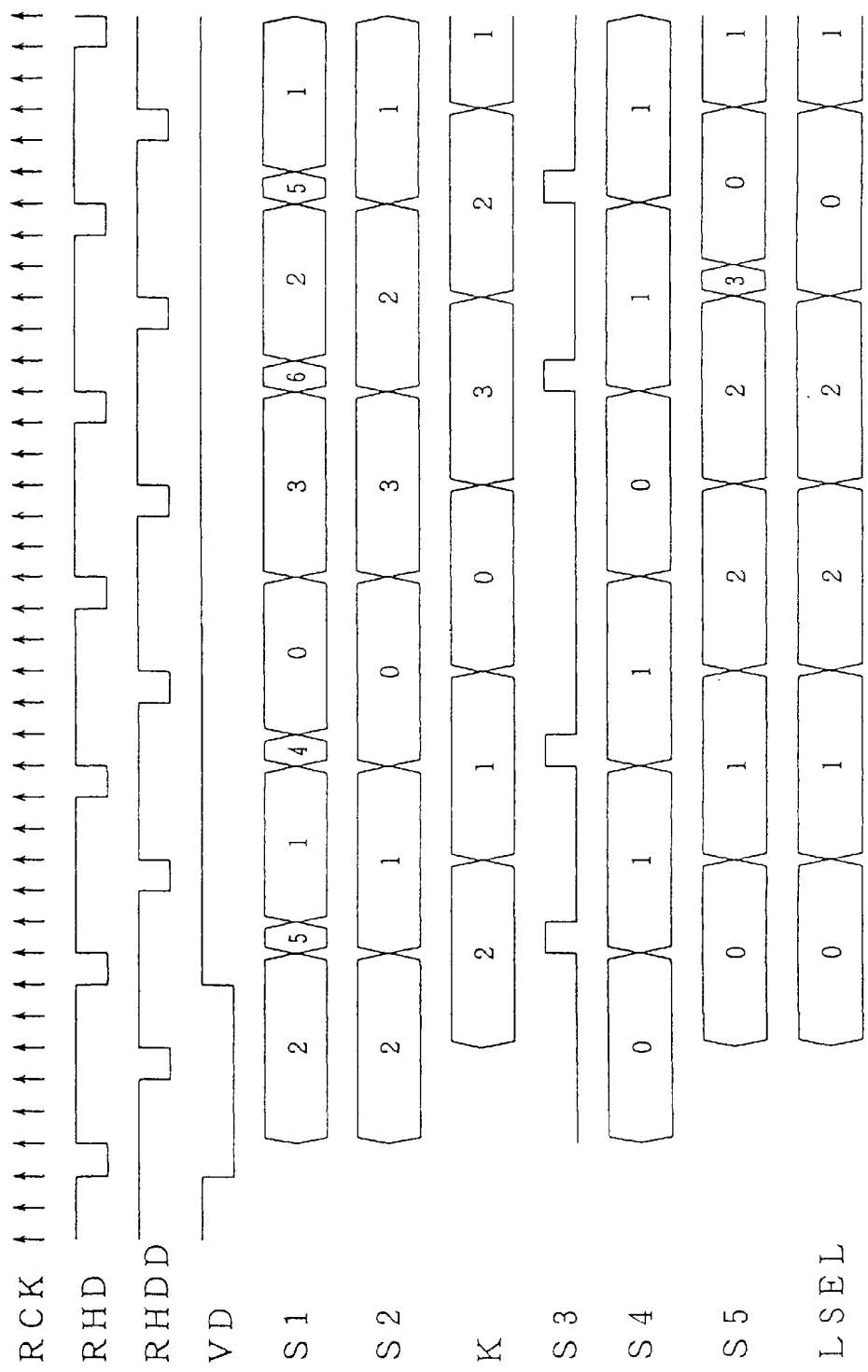
FIG. 20 is a timing chart (part 1) illustrating the operations of the coefficient control circuit 31A and line select control circuit 32A shown in FIG. 19 according to the second embodiment of the present invention in odd-numbered fields when the scanning system is converted from interlaced scanning to sequential scanning and a conversion ratio x:y=) 3:4 and the number of line memories N=3 are satisfied.
Figure 21:
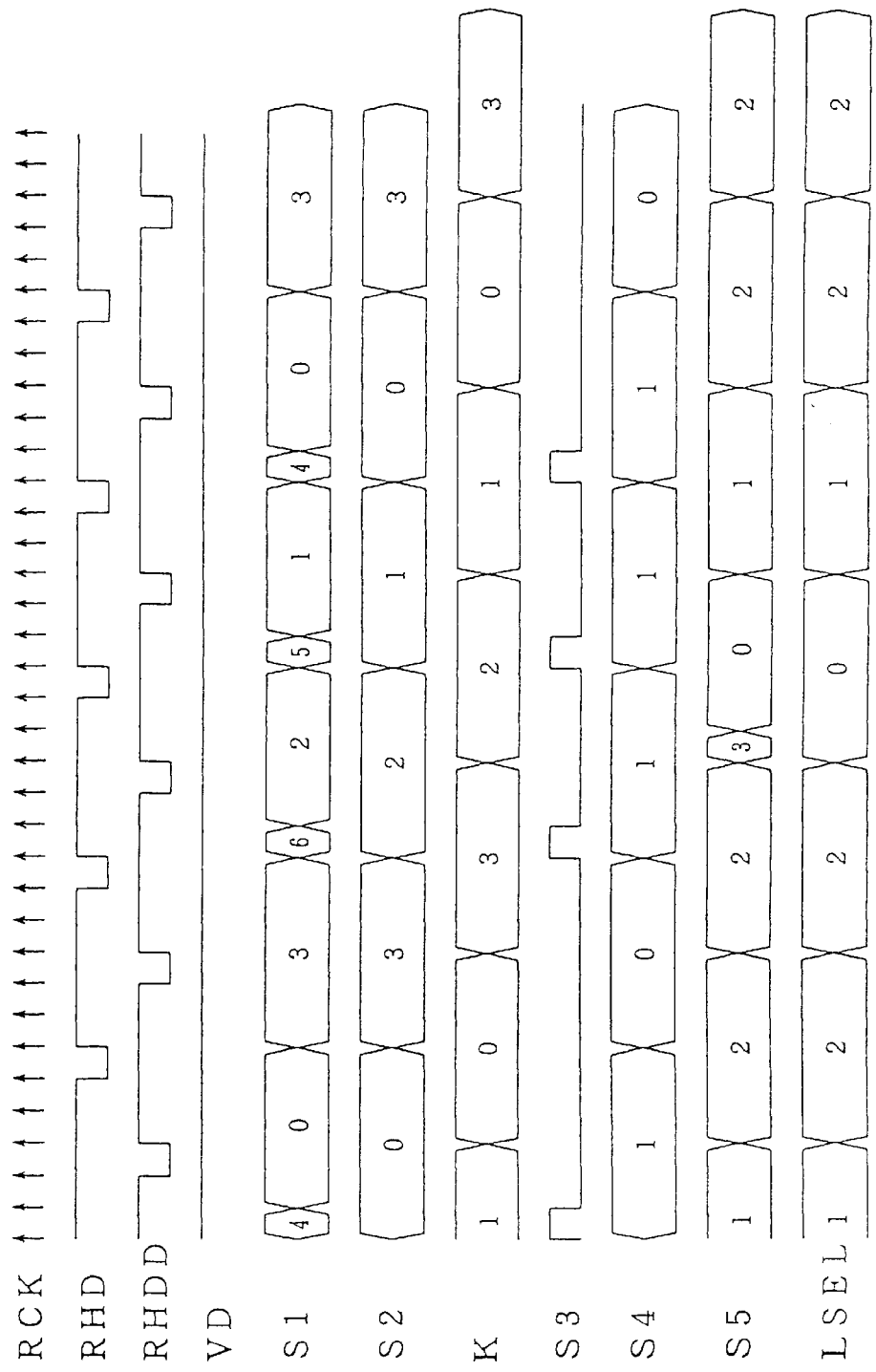
FIG. 21 is a timing chart (part 2) illustrating the operations of the coefficient control circuit 31A and line select control circuit 32A shown in FIG. 19 according to the second embodiment of the present invention in an odd-numbered field when the scanning system is converted from interlaced scanning to sequential scanning and the conversion ratio x:y=3:4 and the number of line memories N=3 are satisfied.

A description will be given to the operations of the coefficient control circuit 31A and of the line select control circuit 32A shown in FIG. 19. FIGS. 20 and 21 are timing charts illustrating the operations of the coefficient control circuit 31A and of the line select control circuit 32A when the number of scanning lines are converted, while the scanning system is converted from interlaced scanning to sequential scanning simultaneously, and when the ratio for converting the number of scanning lines x:y=3:4, the coefficient offset value $z0=2$, the coefficient offset value $z1=0$, and the number of line memories used for conversion N=3 are satisfied. The time base in FIG. 20 is continued to the time base in FIG. 21. The operations illustrated in FIGS. 20 and 21 are performed when the original video signal represents an odd-numbered field, i.e., when the coefficient offset value $z0=2$ is satisfied. In the case of an even-numbered field, the coefficient offset value $z1=0$ is satisfied and the same operation as described in the first embodiment is performed, so that the description thereof is omitted here.

As shown in FIGS. 20 and 21, the number counted by the first counting portion 34 (signal S1) is resetted to "2" when the vertical synchronizing signal VD becomes LOW. Thereafter, every time the horizontal synchronizing signal RHD becomes LOW, the gate of the selecting. circuit 43 is opened, which increments the number counted by the first counting portion 34 by x, i.e., "3". When the number of counts is incremented to reach y, which is a value equal to or more than "4", the output signal S3 from the comparator 45 becomes HIGH and the selecting circuit 47 outputs a value obtained by subtracting "4" from the number of counts S1 as a signal S2. Since the signal S2 outputted from the selecting circuit 47 is transmitted through the selecting circuit 43 and the D flip-flop 44, the subtraction is recursively performed till the signal S1 reaches a value under "4". Consequently, the output signal S2 from the selecting circuit 47 has a value of the remainder when the number S1 counted by the first counting portion 33 is divided by "4". The signal S2 is newly sampled by the selecting circuit 48 with the timing of, the signal RHDD lagging behind the signal RHD by several clocks. Since the signal S2 is generated by recursive subtractions, it may have a transient value immediately after a transition and the sampling is performed so that the signal S2 does not have a transient value. As a result, the coefficient control circuit 31A steadily outputs the coefficient control signal K.

The second counting portion 36 counts the number of times that the number S1 counted by the first counting portion 34 reaches "4", i.e., the number of times that the first remainder calculating portion 35 recursively subtracts "4" from the signal S1. The number of recursive subtractions is obtained by counting the number of times that the output signal S3 from the comparator 45 becomes HIGH. However, since the count operation is resetted by the horizontal synchronizing signal RHD, the output signal one scanning line before is added by the adder 53. The second remainder calculating portion 37 calculates the remainder by subtracting "3" when the signal S5 reaches N which is equal to or more than "3", similarly to the first remainder calculating portion 35. The line select control circuit 32A outputs the result of calculating the remainder from the second remainder calculating portion 37 as the line select signal LSEL. Although the second remainder calculating portion 37 is so constituted as to subtract "3" only once during the period of one horizontal scanning, it may also be so constituted as to perform recursive subtractions, similarly to the first remainder calculating portion 35.

As a result of these operations, the coefficient control signal K and the line select signal LSEL when an odd-numbered field is represented, which are shown in Table 2, are generated, as illustrated in FIGS. 20 and 21.

As described above, by using the structure shown in FIG. 19, the coefficient control signal K and the line control signal LSEL, each for converting the number of scanning lines and the scanning system, can be generated at an arbitrary ratio x:y for converting the number of scanning lines without using a memory such as a RAM or ROM.

Third Embodiment

Referring to FIGS. 22 to 27, a third embodiment of the present invention will be described. The third embodiment of the present invention is for converting the aspect ratio of an image as well as the number of scanning lines.

FIG. 22 shows a display mode when the video signal after conversion of the number of scanning lines is displayed on a display panel. As described above, in the case of using a full mode in which an image is displayed on the entire display panel by fitting a video signal thereto as shown in FIG. 22(*a*), relations among respective sampling clocks and horizontal synchronizing signals on the input and output sides when the ratio for converting the number of scanning lines is x:y are generally represented by the following equations (1):

$$fWCK:fRCK=fWHD:fRHD=x:y \qquad (1)$$

where fA represents the frequency of a signal A.

When the aspect ratio is converted in a normal mode (side panel mode) in which an image is displayed on an output panel with side panels as shown in FIG. 22(*b*), the clock frequency on the output side becomes higher than in the full mode. Specifically, when the ratio of the number of pixels is p:q, relations among the respective sampling clocks and horizontal synchronizing signals on the input and output sides are represented by the following equations (8):

$$fWCK:fRCK=fWHD*p:fRHD*q=x*p:y*q \qquad (8).$$

In a zoom mode (side cut mode) as shown in FIG. 22(*c*), the clock frequency on the output side becomes lower than in the full mode. Specifically, when the ratio of the number of pixels is p:r, relations among the respective sampling clocks and horizontal synchronizing signals on the input and output sides are represented by the following equations (9):

$$fWCK:fRCK=fWHD*p:fRHD*r=x*p:y*r \qquad (9).$$

Figure 23:
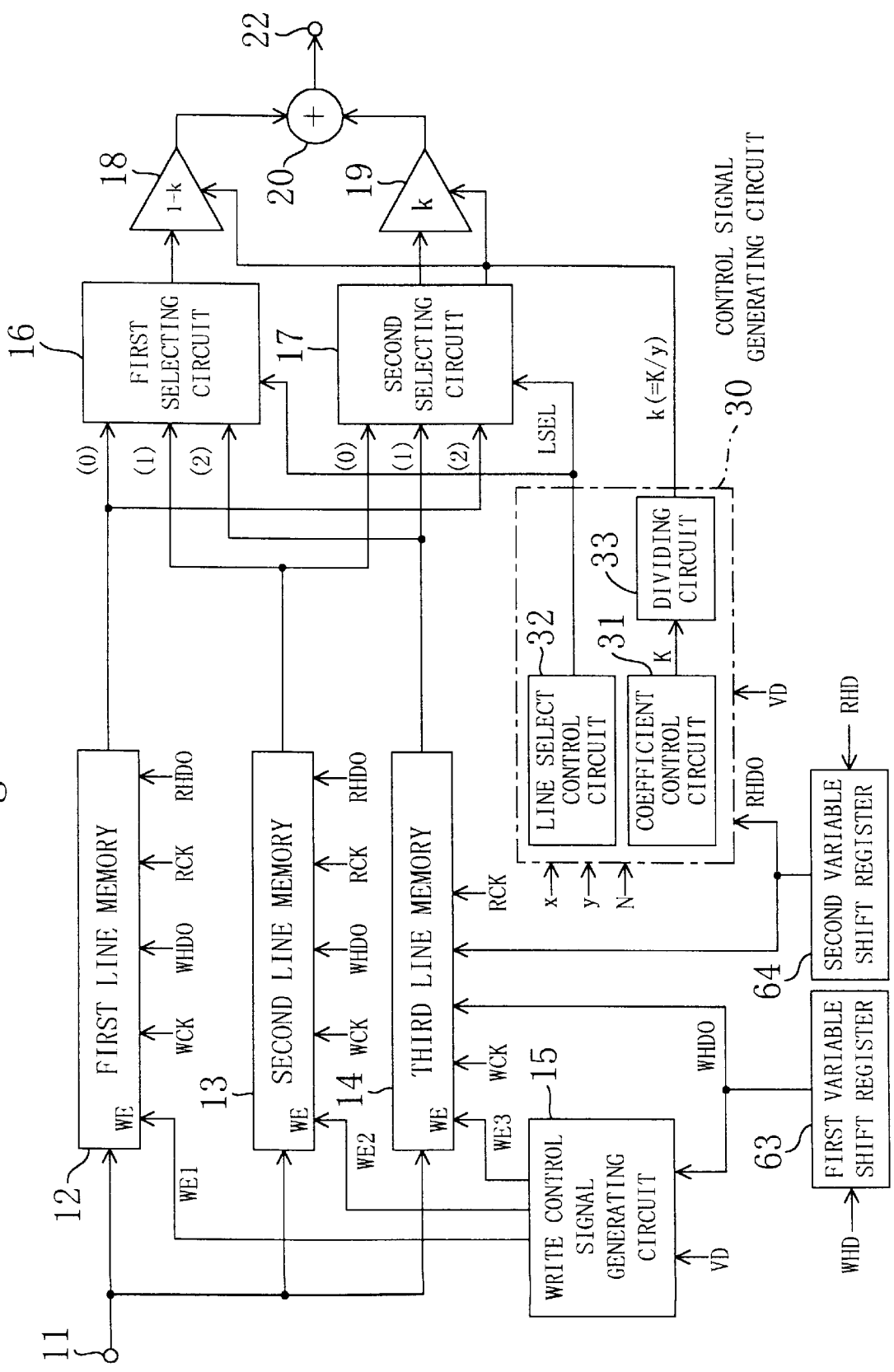
FIG. 23 is a block diagram showing the structure of a scanning line converting circuit according to a third embodiment of the present invention.

FIG. 23 is a block diagram showing the structure of the scanning line converting circuit according to the third embodiment of the present invention. In FIG. 23 are shown: a first variable shift register 63 as first delay means for delaying the horizontal synchronizing signal WHD on the input side for a specified period to generate a signal WHDO and supplying the signal WHDO to the write control signal generating circuit 15 and to the first to third line memories 12 to 14 instead of the horizontal synchronizing signal WHD on the input side; and a second variable shift register 64 as second delay means for delaying the horizontal synchronizing signal RHD on the output side for a specified period to generate a signal RHDO and supplying the signal RHDO to the control signal generating circuit 30 and to the first to third line memories 12 to 14 instead of the horizontal synchronizing signal RHD on the output side. As for the components other than the first and second variable shift registers 63 and 64, they are the same as those used in the scanning line converting circuit according to the first embodiment shown in FIG. 2, so that they are designated at the same reference numerals in FIG. 23. The signal WHDO is used as a reset signal for a write address counter in each of the first to third line memories 12 to 14. The signal RHDO is used as a reset signal for a read address counter in each of the first to third line memories 12 to 14.

A description will be given to the operation of the scanning line converting circuit thus constituted according to the third embodiment. In this case, the description is given to the operation when the aspect ratio is converted by compressing or expanding a video signal concurrently with the conversion of the number of scanning lines.

Figure 24:
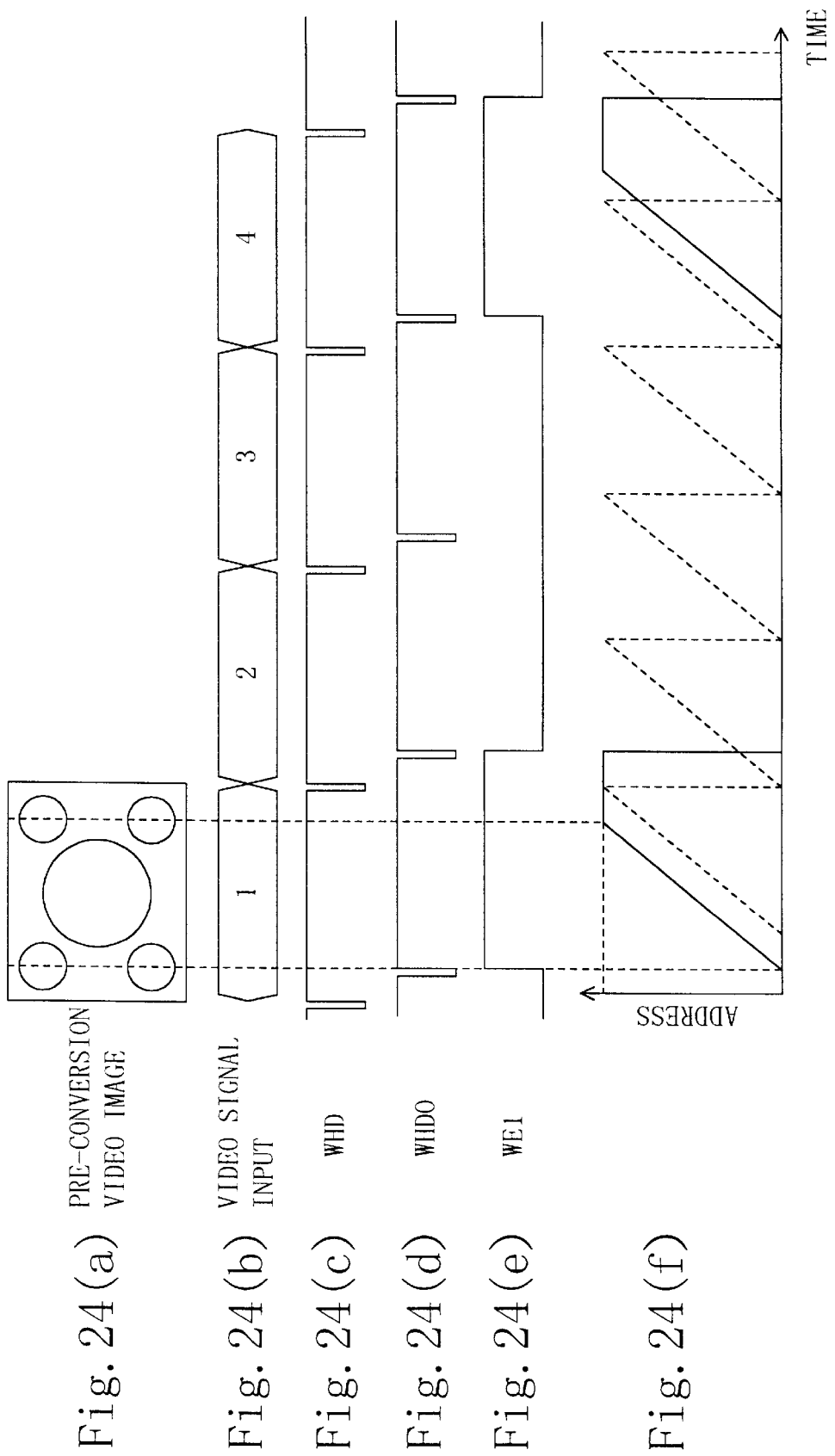
FIG. 24 is a view (part 1) illustrating the operation of the scanning line converting circuit according to the third embodiment of the present invention and a pre-conversion image when the number of scanning lines is converted at a conversion ratio of 3:4 to provide a video signal having a horizontally elongated aspect.
Figure 25:
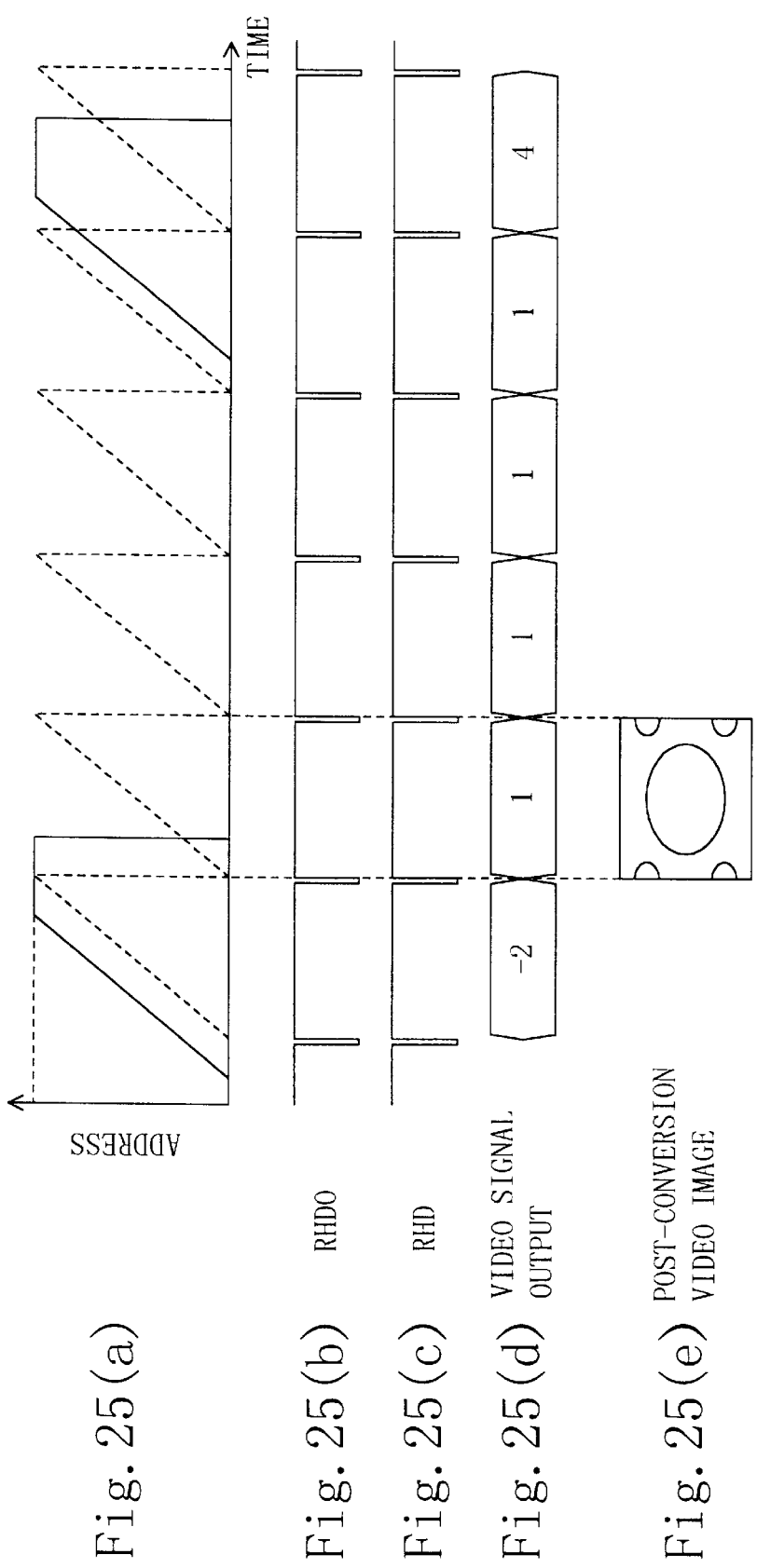
FIG. 25 is a view (part 2) illustrating the operation of the scanning line converting circuit according to the third embodiment of the present invention and a post-conversion image when the number of scanning lines is converted at a conversion ratio of 3:4 to provide the video signal having a horizontally elongated aspect.

FIGS. 24 and 25 illustrate the operation of the scanning line converting circuit according to the present embodiment when an original video signal is converted to a video signal having a horizontally elongated aspect (side cut mode) by expanding the central portion of a pre-conversion image, while the number of scanning lines is converted at a conversion ratio of 3:4. Specifically, the pre-conversion image as shown in FIG. 24(*a*) is converted to the post-conversion video image as shown in FIG. 25(*e*). The time base in FIG. 24 is continued to the time base in FIG. 25. FIG. 24 illustrate the operation when the original video signal is written in the first line memory 12. FIG. 25 illustrate the operation when the post-conversion video signal is read from the first line memory 12. FIG. 24(f) and FIG. 25(a) ate identical and show respective transitions of write and read addresses in the first line memory 12, in which the solid lines indicate write addresses and the broken lines indicate read addresses.

If the ratio for converting the number of scanning lines is x:y and the ratio for horizontal elongation is p:q, the relation between a write clock WCK and a read clock RCK for the line memory is represented by the following equation:

$$fWCK{:}fRCK=x^*q{:}y^*p.$$

If x:y=3:4 and p:q=3:4, fWCK:fRCK=1:1 is satisfied and hence the write clock and the read clock have the same frequency, so that the inclination of the solid line indicative of the write address is the same as the inclination of the broken line indicative of the read address.

FIG. 24(c) shows the horizontal synchronizing signal WHD on the input side when the video signal is inputted with the timing as shown in FIG. 24(b). Instead of the horizontal synchronizing signal WHD on the input side, the signal WHDO as shown in FIG. 24(d), which is obtained by delaying the signal WHD by means of the first variable shift register 63, is supplied to the first line memory 12 as the reset signal for the read address. The increment of a write address is initiated when the pulse of the signal WHDO is inputted as the reset pulse and terminated when the write address reaches the number of pixels corresponding to one scanning line for the post-conversion video signal. As a result, the portion of the pre-conversion image lying between the dotted lines in FIG. 24(a) is written in the first line memory 12.

FIG. 25(c) shows the horizontal synchronizing signal RHD on the output side when the video signal is inputted with the timing as shown in FIG. 25(d). Instead of the horizontal synchronizing signal RHD on the output side, the signal RHDO obtained by delaying the signal RHD by means of the second variable shift register 64 is supplied to the first line memory 12 as the reset signal for the read address. In this case, however, it is assumed that the signal RHD is not delayed by the second variable shift register 64 and the resulting signal RHDO is as shown in FIG. 25(c). The increment of a read address is initiated when the pulse of the signal RHDO is inputted as the reset pulse, i.e., with the pulse timing of the horizontal synchronizing signal RHD on the output side. The video signal read in accordance with the increment of the read address forms the horizontally elongated image as shown in FIG. 25(e).

Figure 26:
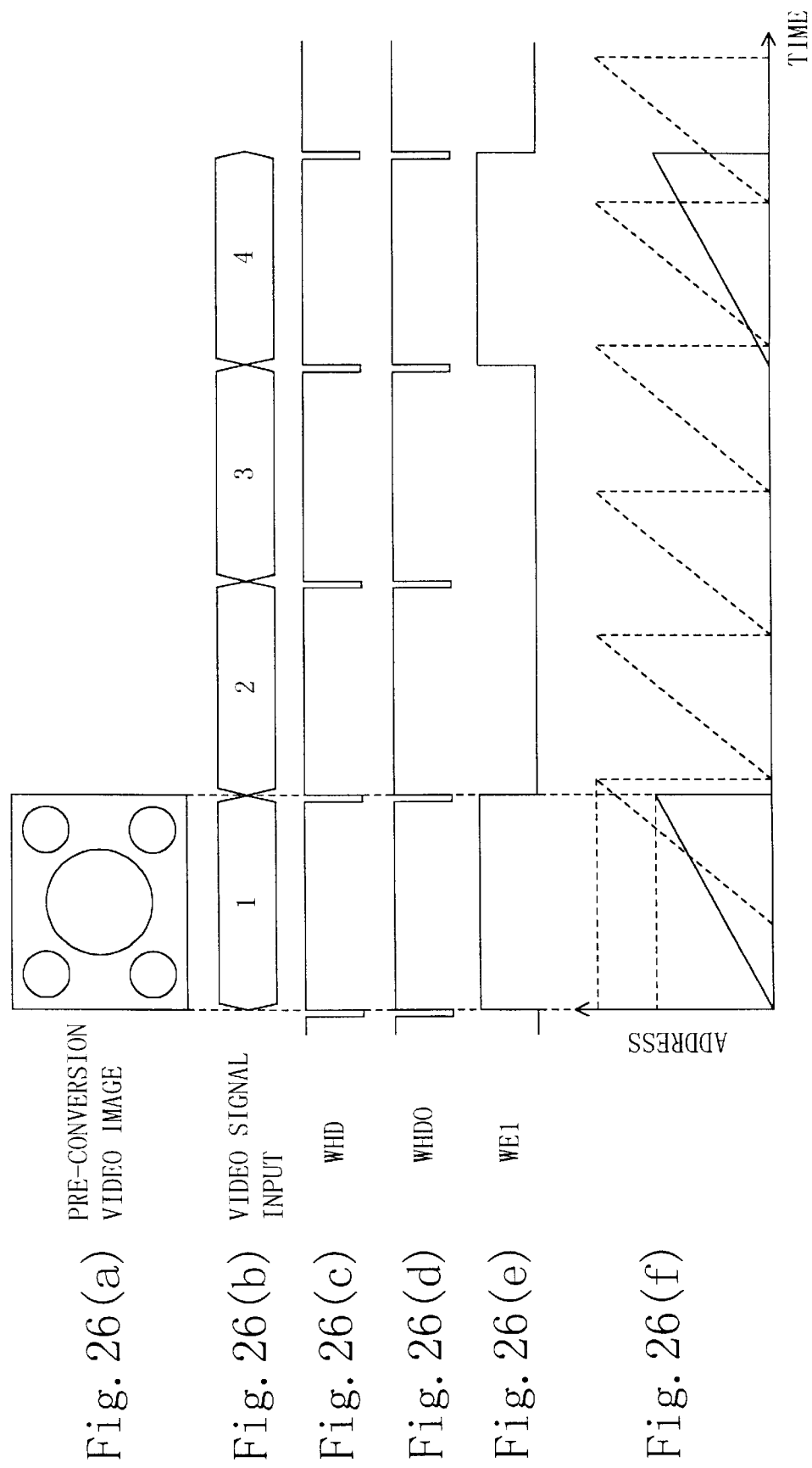
FIG. 26 is a view (part 1) illustrating the operation of the scanning line converting circuit according to the third embodiment of the present invention and a pre-conversion image when the number of scanning lines is converted at a conversion ratio of 3:4 to provide a video signal having a vertically elongated aspect.
Figure 27:
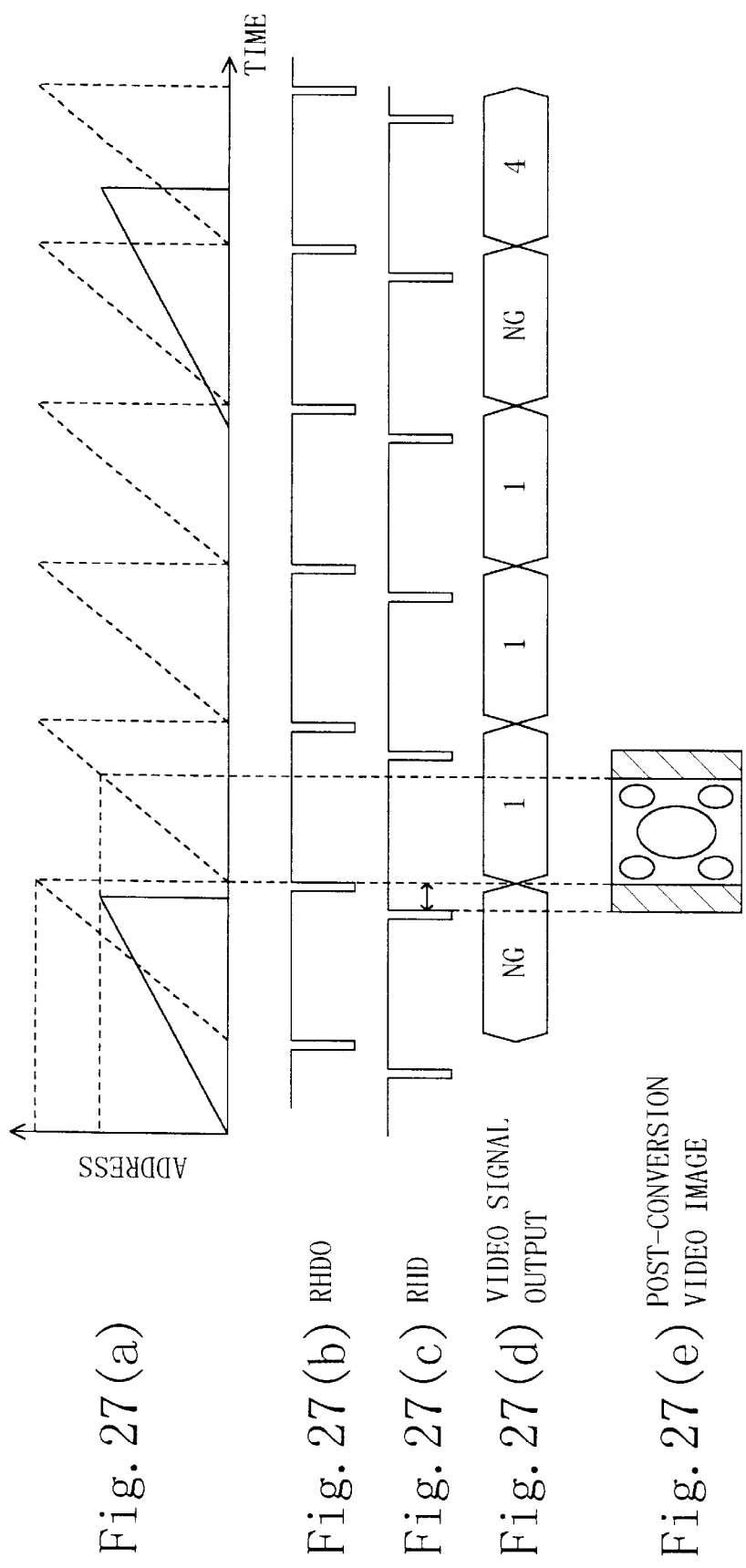
FIG. 27 is a view (part 2) illustrating the operation of the scanning line converting circuit according to the third embodiment of the present invention and a post-conversion image when the number of scanning lines is converted at a conversion ratio of 3:4 to provide the video signal having a vertically elongated aspect.

FIGS. 26 and 27 illustrate the operation of the scanning line converting circuit according to the present embodiment when an original video signal is converted to a video signal having a vertically elongated aspect (side panel mode) by horizontally compressing a pre-conversion image. Specifically, the pre-conversion image as shown in FIG. 26(a) is converted to the post-conversion image as shown in FIG. 27(e). The time base in FIG. 26 is continued to the time base in FIG. 27. FIG. 26 illustrate the operation when the original video signal is written in the first line memory 12. FIG. 27 illustrate the operation when the post-conversion video signal is read from the first line memory 12. FIG. 26(f) and FIG. 27(a) are identical and show respective transitions of write and read addresses in the first line memory 12, in which the solid lines indicate write addresses and broken lines indicate read addresses.

If x:y=3:4 and p:q=4:3, fWCK:fRCK=9:16 is satisfied, so that the solid line indicative of the write address and the broken lines indicative of the read address have the inclinations as shown in FIGS. 26(f) and 27(a).

FIG. 26(c) shows the horizontal synchronizing signal WHD on the input side when the video signal is inputted with the timing as shown in FIG. 26(b). Instead of the horizontal synchronizing signal WHD on the input side, the signal WHDO obtained by delaying the signal WHD by means of the first variable shift register 63 is supplied to the first line memory 12 as a reset signal for a write address. In this case, however, it is assumed that the signal WHD is not delayed by the first variable shift register 63 and the resulting signal WHDO is as shown in FIG. 26(d). The increment of a write address is initiated when the pulse of the signal WHDO is inputted as the reset pulse, i.e., with the pulse timing of the horizontal synchronizing signal WHD on the input side and continued till the signal WHDB is newly inputted. However, the write address is resetted till the number of words in the first line memory 12, i.e, the number of pixels corresponding to one scanning line for the post-conversion video signal is reached, as shown in FIG. 26(f). As a result, the video signal representing one scanning line for the original video signal is stored in the number of words smaller than the number of pixels corresponding to one scanning line for the output video signal in the first line memory 12.

FIG. 27(c) shows the horizontal synchronizing signal RHD on the output side when the video signal is inputted with the timing as shown in FIG. 27(d). Instead of the horizontal synchronizing signal RHD on the output side, the signal RHDO as shown in FIG. 27(b), which is,obtained by delaying the signal RHD by means of the second variable shift register 64, is supplied to the first line memory 12 as the reset signal for the read address. The increment of a read address is initiated when the pulse of the signal RHDO is inputted as the reset pulse and the video signal read in accordance with the increment of the read address form the horizontally compressed image as shown in FIG. 27(e).

Thus, the scanning line converting circuit according to the present embodiment as shown in FIG. 24 accomplishes the conversion of the aspect ratio of the video signal simultaneously with the conversion of the number of scanning lines.

Fourth Embodiment

Figure 28:
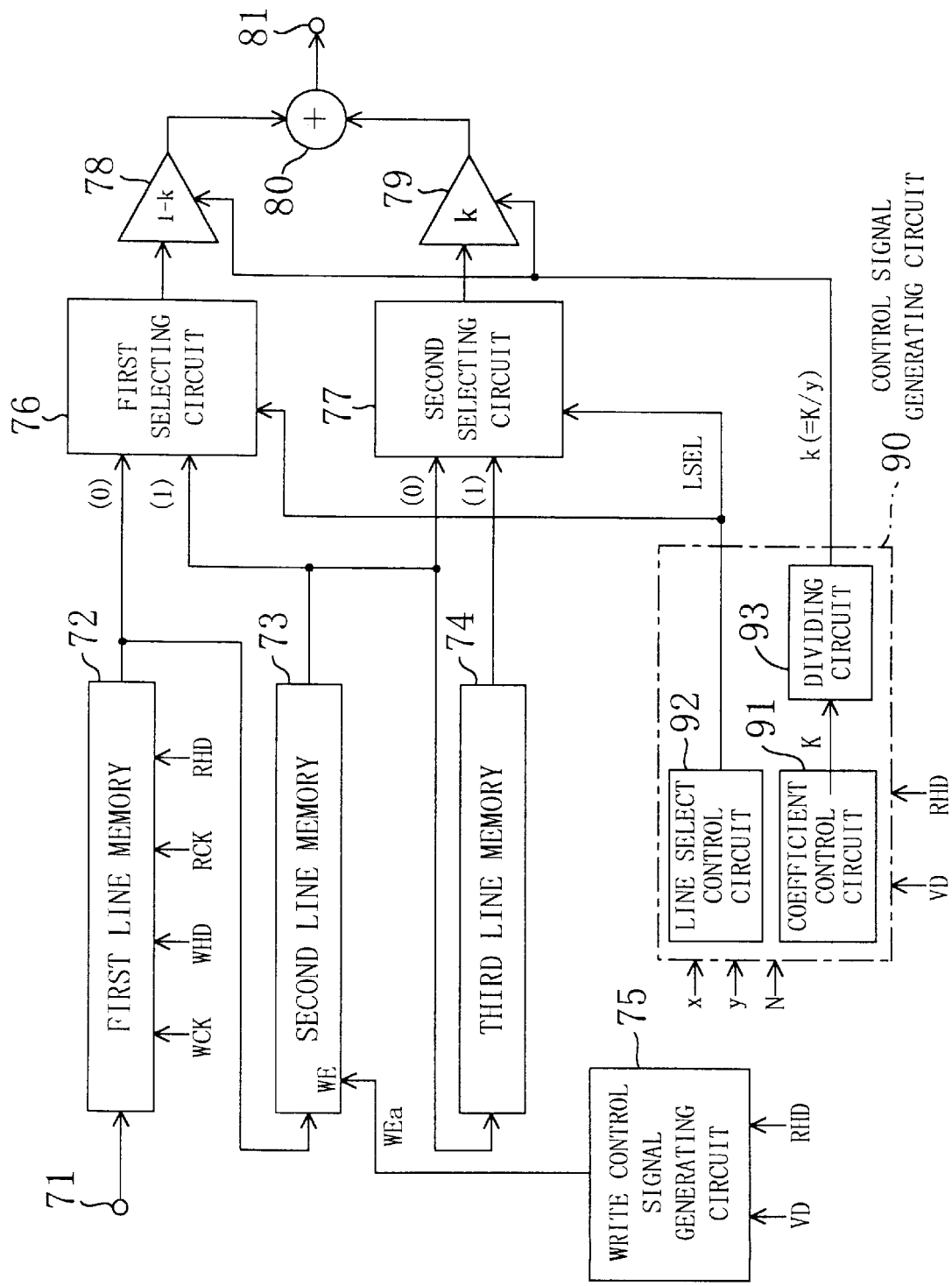
FIG. 28 is a block diagram showing the structure of a scanning line converting circuit according to a fourth embodiment of the present invention.
Figure 29:
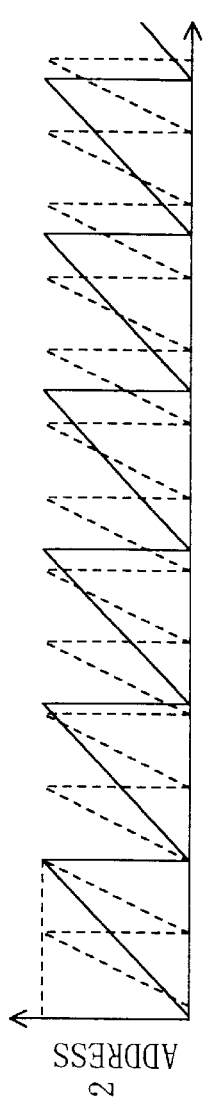
FIGS. 29(a) to 29(i) are timing charts (part 1) illustrating the operation of the scanning line converting circuit according to the fourth embodiment when the number of scanning lines is converted at a conversion ratio of 7:15.
Figure 30:
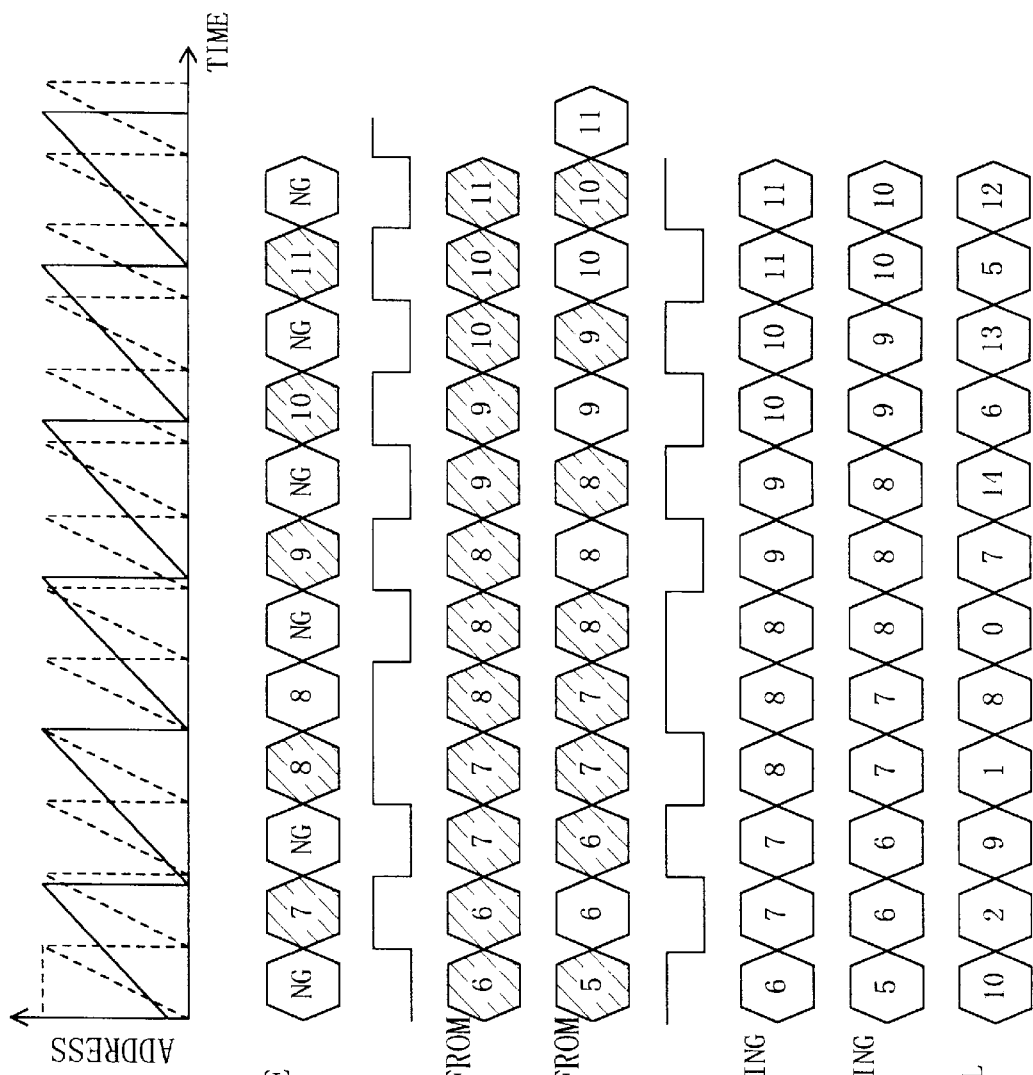
FIGS. 30(a) to 30(i) are timing charts (part 2) illustrating the operation of the scanning line converting circuit according to the fourth embodiment when the number of scanning lines is converted at a conversion ratio of 7:15.
Figure 31:
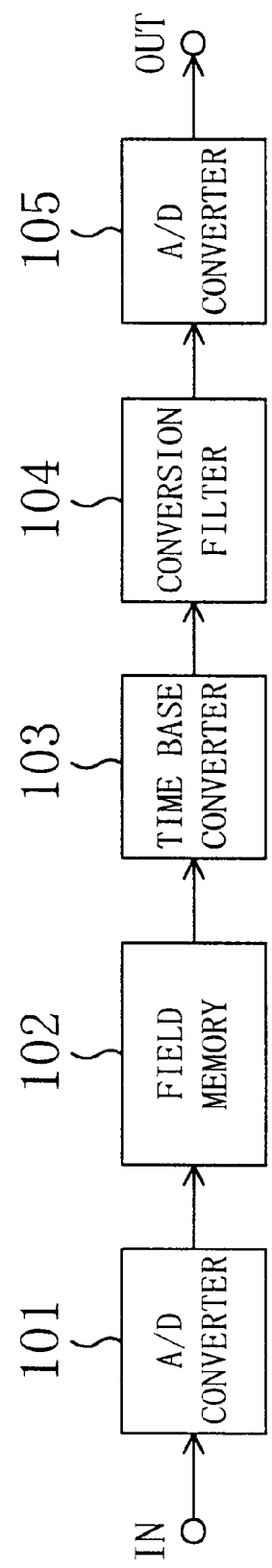
FIG. 31 is a block diagram showing the structure of a conventional scanning line converting circuit.

Referring to FIGS. 28 to 30, a fourth embodiment of the present invention will be described. FIG. 28 is a block diagram showing the structure of a scanning line converting circuit according to the fourth embodiment of the present invention. In FIG. 28 are shown: an input terminal 71 for receiving an original video signal; a first line memory 72 connected to the input terminal 71 to store the original video image inputted to the input terminal 71 on a scanning-line basis such that write and read operations to the first line memory 72 are controlled independently and asynchronously; a second line memory 73 connected in cascade to the first line memory 72 such that a write operation thereto is controlled; a third line memory 74 connected in cascade to the second line memory 72 to delay the video signal by only one scanning line; and a write control signal generating circuit 75 for generating a write control signal WEa for controlling the write operation to the second line memory 73.

There are also shown: first and second selecting circuits 76 and 77 each for selecting among output signals from the first to third line memories 72 to 74 such that the selected signal or signals represent only one scanning line necessary to generate a post-conversion scanning line; first and second coefficient multipliers 78 and 79 for receiving respective output signals from the first and second selecting circuits 76 and 77 to perform weighting corresponding to the placement of the post-conversion scanning line with respect to the received signals; an adder 80 for adding up respective output signals from the first and second coefficient multipliers 78 and 79; and an output terminal 81 from which an output from the adder 80 is outputted as a post-conversion scanning line signal.

A control signal generating circuit 90 comprises: a coefficient control circuit 91 for generating a coefficient control signal K for controlling the weight used in the weighting process performed by the first and second coefficient multipliers 78 and 79; a line select control circuit 92 for generating a line select signal LSEL for controlling the first and second selecting circuits 76 and 77; and a dividing circuit 93 for converting the coefficient control signal K to coefficient direct signal k supplied to the first and second coefficient multipliers 78 and 79. The dividing circuit 93 divides, when the scanning line conversion ratio is x:y, the coefficient control signal K generated from the coefficient control circuit 91 by y and outputs the resulting signal as the coefficient direct signal k. Based on the coefficient direct signal k, the first and second coefficient multipliers 78 and 79 multiply respective input signals by (1−K) and k (0≦k≦1) as interpolation coefficients.

A sampling clock WCK and a horizontal synchronizing signal WHD for the original video signal are used as a drive clock and a reset signal for a write address counter in the first line memory 72. Likewise, a sampling clock RCK and a horizontal synchronizing signal WHD for the post-conversion video signal are used as a drive clock and a reset signal for a read address counter in the first line memory 72.

The first to third line memories 72 to 74, the write control signal generating circuit 75, the first and second selecting circuits 76 and 77, and the line select control circuit 92 compose the scanning-line selective outputting means. The first and second coefficient multipliers 78 and 79, the adder 80, the coefficient control circuit 91, and the dividing circuit 93 compose the scanning line interpolating means. The coefficient control circuit 91 and the dividing circuit 93 compose the interpolation coefficient generating means. The write control signal generating circuit 75 composes the write control means. The first and second selecting circuits 76 and 77 compose the selecting means. The line select control circuit 92 composes the select control means.

The operation of the scanning line converting circuit thus constituted according to the fourth embodiment will be described. The description will be given to the case where an NTSC signal is converted to a HDTV signal, i.e. where the ratio for converting the number of scanning lines is 7:15 (=525:1125), similarly to the first embodiment. The placement of the scanning lines, the lines in use, and the interpolation coefficient in this case are as shown in FIG. 3.

FIGS. 29 and 30 are timing charts illustrating the operation of the scanning line converting circuit according to the present embodiment shown in FIG. 28 when the NTSC signal is converted to the HDTV signal, i.e., when the ratio for converting the number of scanning lines is 7:15 (=525:1125). FIGS. 29 and 30 are continuous in time sequence.

FIGS. 29(*a*) and 30(*a*) show respective transitions of write and read addresses in the first line memory 72, in which the solid lines represent write addresses and the broken lines represent read addresses. As shown in FIGS. 29(*a*) and 30(*a*), write operations are performed consecutively in the first line memory 72, while read operation are also performed consecutively in the first line memory 72. As indicated by the solid lines in FIGS. 29(*a*) and 30(*a*), the original video signal inputted to the input terminal 71 is written in the first line memory 72 on a scanning-line basis, while the video signal is read from the first line memory 72 on a scanning-line basis, as indicated by the broken lines in FIGS. 29(*a*) and 30(*a*). The ratio of the write address cycle to the read address cycle is 15:7.

As a result of these operations, the first line memory 72 produces output signals as shown in FIGS. 29(*b*) and 30(*b*). In FIGS. 29(*b*) and 30(*b*), "NG" indicates the case where a read address outstrips a write address during a read operation and therefore the same-numbered scanning line signal cannot be read in the read operation. In this case, the read signal is not appropriate for a scanning line signal and becomes invalid.

The output signals from the first line memory 72 are supplied to the second line memory 73 and to the first selecting circuit 76. The write control signal generating circuit 75 generates a write control signal WE (see FIGS. 29(*c*) and 30(*c*)) for disabling a write operation to the second line memory 73 when the output signals from the first line memory 72 are invalid scanning line signals. When the write control signal WE is LOW, the second line memory 73 interrupts the write operation by halting the internal address counter on the write side. Consequently, output signals from the second line memory 73 do not include an invalid scanning line signal, as shown in FIGS. 29(*d*) and 30(*d*).

The output signals from the second line memory 73 are supplied to the third line memory 74 and to the first and second selecting circuits 76 and 77. As shown in FIGS. 29(*e*) and 30(*e*), the third line memory 74 simply delays the output signals from the second line memory 73 by only one scanning line and outputs the delayed signals. Output signals from the third line memory 72 are supplied to the second selecting circuit 77.

In FIG. 28, the numeric characters inside the parentheses accompanying the signal lines connecting the first to third line memories 72 to 74 to the first and second selecting circuits 76 and 77 indicate the values of the line select signals LSEL when the signal lines are selected. Specifically, the first selecting circuit 76 selects the first line memory 72 when the line select signal LSEL is (0) (i.e., LOW) and the second line memory 73 when the LSEL is (1) (i.e., HIGH). On the other hand, the second selecting circuit 77 selects the second line memory 73 when the line select signal LSEL is (0) and the third line memory 74 when the LSEL is (1).

FIGS. 29(*f*) and 30(*f*) show the transition of the line select signal LSEL generated from the control signal generating circuit 90. Based on the line select signal LSEL shown in FIGS. 29(*f*) and 30(*f*), the first and second selecting circuits 76 and 77 select the hatched ones of the output signals from the first to third line memories 72 to 74 shown in FIGS. 29(*b*), 29(*d*) and 29(*e*) and in FIGS. 30(*b*), 30(*d*) and 30(*e*). FIGS. 29(*g*) and 29(*h*) and FIGS. 30(*g*) and 30(*h*) show scanning line signals consequently outputted from the first and second selecting circuits 76 and 77, which coincide with lines in use shown in FIG. 3, i.e., the numbers assigned to the scanning lines for the original video signal used to generate post-conversion scanning lines.

The output signals from the first and second selecting circuits 76 and 77 are inputted to the first and second coefficient multipliers 78 and 79, respectively. The coefficient control signal K (=15×coefficient direct signal k) has values as shown in FIGS. 29(*i*) and 30(*i*) such that the first and second coefficient multipliers 78 and 79 operate based on coefficients as shown in FIG. 3. The first and second coefficients 78 and 79 have their gains controlled to be (1−k) and k (k varies from one scanning line to another as shown in FIG. 3) responsive to the coefficient direct signal k. The respective output signals from the coefficient multipliers 78 and 79 are added up by the adder 80 and the sum is outputted from the output terminal 81 as a post-conversion scanning line signal.

In this manner, conversion of the number of scanning lines at a conversion ratio of 7:15 is accomplished by using the structure shown in FIG. 29. Hardware used in this case is smaller than the structure shown in FIG. 2.

Although the three line memories have been used in each of the structures according to the first to fourth embodiments, the number of line memories may be increased as desired provided that it is more than two. In the case where N line memories (N is an integer equal to or more than 4) are used in the scanning line converting circuits according to the first to third embodiments, they are properly constituted such that the original video signal is written in the individual line memories on a scanning-line basis, similarly to those used in the first to fourth embodiments. In this case, one scanning line signal is written in each of the line memories for every N scanning lines for the original video signal, so that the line select control signal LSEL is generated accordingly. In the case of the scanning line converting circuit according to the fourth embodiment, it is constituted such that a plurality of line memories are connected in cascade to the line memory 73.

Although the two coefficient multipliers have been used in each of the first to fourth embodiments, it is also possible to provide only one coefficient multiplier. If the output signal from the selecting circuit 16 is given as A and the output signal from the selecting circuit 17 is given as B in the first to third embodiments, a signal C outputted from the output terminal 21 satisfies the following equations:

$$C=(1-K) \times A + k \times B = A + k \times (B-A).$$

Hence, the scanning line converting circuit according to the present invention can be implemented by adding one subtractor for calculating (B−A) even when only one coefficient multiplier is provided.

We claim:

1. A scanning line converting circuit for converting the number of scanning lines for a video signal, comprising:

scanning-line selective outputting means for selecting, from scanning line signals composing an original video signal, at least one necessary to generate a post-conversion scanning line signal and outputting the selected scanning line signal, said scanning line selective outputting means being operative such that speed and timing of signal outputting are set independently of speed and timing of signal inputting; and scanning line interpolating means having interpolation coefficient generating means for generating an interpolation coefficient based on a predetermined conversion ratio of the number of scanning lines, said scanning line interpolating means multiplying the scanning line signal selectively outputted from said scanning-line selective outputting means by the interpolation coefficient generated from said interpolation coefficient generating means and adding up the results of multiplication to generate the post-conversion scanning line signal, said interpolation coefficient generating means being so constituted as to generate the interpolation coefficient based on at least two scanning line conversion ratios of the number of scanning lines.

2. A scanning line converting circuit for converting the number of scanning lines for a video signal, comprising:

scanning-line selective outputting means for selecting, from scanning line signals composing an original video signal, at least one necessary to generate a post-conversion scanning line signal and outputting the selected scanning line signal; and scanning line interpolating means having interpolation coefficient generating means for generating an interpolation coefficient based on a predetermined conversion ratio of the number of scanning lines, said scanning line interpolating means multiplying the scanning line signal selectively outputted from said scanning-line selective outputting means by the interpolation coefficient generated from said interpolation coefficient generating means and adding up the results of multiplication to generate the post-conversion scanning line signal, said interpolation coefficient generating means being so constituted as to generate the interpolation coefficient based on at least conversion ratios of the number of scanning lines, wherein said interpolation coefficient generating means generates, when the predetermined conversion ratio is x:y, (1−K/y) and (K/y) as respective interpolation coefficients for the chronologically anterior one and the chronologically posterior one of two scanning line signals necessary to generate the post-conversion scanning line signal (where K=(LN(x) % y is satisfied, LN is a number assigned to the post-conversion scanning line signal, and % is remainder calculation).

3. A scanning line converting circuit according to claim 2, wherein said interpolation coefficient generating means comprises a coefficient control circuit having:

a counting portion for incrementing, by x, a number counted thereby with every timing of horizontally synchronizing the post-conversion video signal; and a remainder calculating portion for dividing, by y, the number counted by the counting portion to calculate a remainder, said coefficient control circuit outputting, as said K, a value of the remainder calculated by the remainder calculating portion.

4. A scanning line converting circuit according to claim 1, wherein said scanning-line selective outputting means has a plurality of line memories for storing the original video signal on a scanning-line basis and is constituted such that the scanning line signal necessary to generate the post-conversion scanning line signal is selectively outputted from said plurality of line memories irrespective of relations among the set speeds and timings for signal inputting and signal outputting.

5. A scanning line converting circuit according to claim 1, further comprising:

first delay means for delaying, for a predetermined period, a horizontal synchronizing signal for the original video signal and outputting the delayed signal; and second delay means for delaying, for a predetermined period, a horizontal synchronizing signal for a post-conversion video signal and outputting the delayed signal, said scanning-line selective outputting means receiving said original video signal on a scanning-line basis at the set speed and with the timing of the output signal from said first delay means, and selectively outputting the scanning line signal necessary to generate the post-conversion scanning line signal at the set speed and with the timing of the output signal from said second delay means.

6. A scanning line converting circuit for converting the number of signal lines for a video signal, comprising:

scanning-line selective outputting means having a plurality of line memories for storing an original video signal on a scanning-line basis, said scanning-line selective outputting means selecting, from scanning line signals stored in the plurality of line memories, at least one necessary to generate a post-conversion scanning line signal and outputting the selected scanning line signal; and scanning line interpolating means for multiplying the scanning line signal selectively outputted from said scanning-line selective outputting means by an interpolation coefficient and adding up the results of multiplication to generate the post-conversion scanning line signal, said scanning-line selective outputting means being constituted such that respective speeds and timings for signal inputting and signal outputting are independently set and that the scanning line signal necessary to generate the post-conversion scanning line signal is selectively outputted from said plurality of line memories irrespective of relations among the set speeds and timings for signal inputting and signal outputting.

7. A scanning line converting circuit according to claim 6, wherein said plurality of line memories are composed of line memories of a predetermined number obtained by adding N (N is a positive integer) to the number of scanning line signals necessary to generate the post-conversion scanning line signal, each of line memories allowing signal writing and signal reading to be performed independently such that a write operation is performed in accordance with the set speed and timing for signal inputting and that a read operation is performed in accordance with the set speed and timing for signal outputting and said scanning-line selective outputting means comprises:

write control means for controlling each of said line memories such that said original video signal is written therein on the scanning-line basis;

selecting means for selecting at least one from said plurality of line memories and outputting an output signal from the selected line memory as the signal necessary to generate the post-conversion scanning line signal; and select control means for directing said select means to select the line memory in which the scanning line signal necessary to generate the post-conversion scanning line signal is stored and a read address does not outstrip a write address or a read address is not outstripped by a write address during the read operation performed thereto such that a signal appropriate for the scanning line signal is outputted therefrom.

8. A scanning line converting circuit according to claim 6, wherein said plurality of line memories are composed of:

a first line memory allowing signal writing and signal reading to be performed independently such that said original video signal is written therein on the scanning-line basis in accordance with the set speed and timing for signal inputting and that the scanning line signal is read therefrom in accordance with the set speed and timing for signal outputting;

a second line memory receiving an output signal from said first line memory such that signal writing and signal reading is performed in synchronization with a read operation to said first line memory; and an N (N is a positive integer) number of third line memories connected in cascade to said second line memory such that signal writing and signal reading is performed in synchronization with the read operation to said first line memory and said scanning-line selective outputting means is composed of:

write control means for disabling a write operation to said second line memory when a read address outstrips a write address or a read address is outstripped by a write address during the read operation to said first line memory and therefore a signal inappropriate for the scanning line signal is outputted from said first line memory;

selecting means for selecting at least one from said plurality of line memories and outputting an output signal from the selected line memory as the scanning line signal necessary to generate the post-conversion scanning line signal; and select control means for directing said selecting means to select the line memory outputting the scanning line signal necessary to generate the post-conversion scanning line signal and not to select said first line memory when a read address outstrips a write address or a read address is outstripped by a write address during the read operation thereto such that a signal inappropriate for the scanning line signal is outputted therefrom.

9. A scanning line converting circuit according to claim 6, further comprising:

first delay means for delaying, for a predetermined period, a horizontal synchronizing signal for the original video signal and outputting the delayed signal; and second delay means for delaying, for a predetermined period, a horizontal synchronizing signal for a post-conversion video signal and outputting the delayed signal, said scanning-line selective outputting means receiving said original video signal on the scanning-line basis at the set speed and with the timing of the output signal from said first delay means and selectively outputting the scanning line signal necessary to generate the post-conversion scanning line signal at the set speed and with the timing of the output signal from said second delay means.

10. A scanning line converting circuit for converting the number of scanning lines for a video signal and a system for scanning the video signal, comprising:

scanning-line selective outputting means for selecting, from scanning line signals composing an original video signal, at least one necessary to generate a post-conversion scanning line signal and outputting the selected scanning line signal; and scanning line interpolating means having interpolation coefficient generating means for generating an interpolation coefficient based on a predetermined conversion ratio of the number of scanning lines, said scanning line interpolating means multiplying the scanning line signal; selectively outputted from said scanning-line selective outputting means by the interpolation coefficient generated from said interpolation coefficient generating means and adding up the results of multiplication to generate the post-conversion scanning line signal, said interpolation coefficient generating means being so constituted as to generate, when the system for scanning the video signal is converted from interlaced scanning to sequential scanning or from sequential scanning to interlaced scanning, an interpolation coefficient in accordance with each field in interlaced scanning such that the post-conversion video signal does not form a blurred image.

11. A scanning line converting circuit according to claim 10, wherein said interpolation coefficient generating means generates, when the predetermined conversion ratio is x:y, (1−K/y) and (K/y) as respective interpolation coefficients for the chronologically anterior one and the chronologically posterior one of two scanning line signals necessary to generate the post-conversion scanning line signal (where K=(LN×x) % y is satisfied, LN is a number assigned to the post-conversion scanning line signal, z is an offset value set in accordance with each field in interlaced scanning, and % is remainder calculation).

12. A scanning line converting circuit according to claim 11, wherein said interpolation coefficient generating means comprises a coefficient control circuit having:
  a selecting circuit for selectively outputting, as z, the offset value in accordance with a field under conversion;
  a counting portion using z selectively outputted from said selecting circuit as a reset value to increment, by x, a number counted thereby with every timing of horizontally synchronizing the post-conversion video signal; and
  a remainder calculating portion for dividing, by y, the number counted by said counting portion to calculate a remainder,
    said coefficient control circuit outputting, as said K, a value of the remainder calculated by the remainder calculating portion.

13. An interpolation coefficient generating circuit used in converting the number of scanning lines for a video signal to generate an interpolation coefficient based on a predetermined ratio for converting the number of scanning lines, said interpolation coefficient generating circuit generating, when the predetermined scanning line conversion ratio is x:y, (1−K/y) and (K/y) as respective interpolation coefficients for the chronologically anterior one and the chronologically posterior one of two scanning line signals necessary to generate a post-conversion scanning line signal (where K=(LN×x) % y is satisfied, LN is a number assigned to the post-conversion scanning line signal, and % is remainder calculation).

14. An interpolation coefficient generating circuit according to claim 13, comprising a coefficient control circuit having:
  a counting portion for incrementing, by x, a number counted thereby with every timing of, horizontally synchronizing the post-conversion video signal; and
  a remainder calculating portion for dividing, by y, the number counted by the counting portion to calculate a remainder,
    said coefficient control circuit outputting, as said K, a value of the remainder calculated by the remainder calculating portion.

15. An interpolation coefficient generating circuit used in converting the number of scanning lines for a video signal and a system for scanning the video signal to generate an interpolation coefficient based on a predetermined ratio for converting the number of scanning lines, said interpolation coefficient generating circuit generating, when the scanning line conversion ratio is at x:y, (1−K/y) and (K/y) as respective interpolation coefficients for the chronologically anterior one and the chronologically posterior one of two scanning line signals necessary to generate a post-conversion scanning line signal (where K=(LN×x) % y is satisfied, LN is a number assigned to the post-conversion scanning line signal, z is an offset value set in accordance with each field in interlaced scanning, and % is remainder calculation).

16. An interpolation coefficient generating circuit according to claim 15, comprising a coefficient control circuit having:
  a selecting circuit for selectively outputting, as z, the offset value in accordance with a field under conversion;
  a counting portion using z selectively outputted from said selecting circuit as a reset value to increment, by x, a number counted thereby with every timing of horizontally synchronizing the post-conversion video signal; and
  a remainder calculating portion for dividing, by y, the number counted by said counting portion to calculate a remainder,
    said coefficient control circuit outputting, as said K, a value of the remainder calculated by the remainder calculating portion.

17. A scanning line converting circuit according to claim 1, wherein said independent setting of speed and timing of signal inputting and signal outputting allows for data to be written into said scanning-line selective outputting means and read from said scanning-line selective outputting means at different rates.

18. A scanning line converting circuit according to claim 17, wherein separate and independent clock signals are utilized to write data into said scanning-line selective outputting means and to read data from said scanning-line selective outputting means.

19. A scanning line converting circuit for converting the number of scanning lines for a video signal, comprising:
  scanning-line selective outputting means for selecting from scanning line signals composing an original video signal, at least one necessary to generate a post-conversion scanning line signal and outputting the selected scanning line signal, said scanning line selective outputting means comprising a plurality of line memories for storing data representing said video signal on a scanning line basis, said plurality of line memories having data written thereto utilizing a first clock signal and having data read therefrom utilizing a second clock signal, said first clock signal and said second clock signal being separate and independent from one another such that said data can be written into said plurality of line memories and read from said plurality of line memories at different rates; and
  scanning line interpolating means having interpolation coefficient generating means for generating an interpolation coefficient based on a predetermined conversion ratio of the number of scanning lines, said scanning line interpolating means multiplying the scanning line signal selectively outputted from said scanning-line selective outputting means by the interpolation coefficient generated from said interpolation coefficient generating means and adding up the results of multiplication to generate the post-conversion scanning line signal,
    said interpolation coefficient generating means being so constituted as to generate the interpolation coefficient based on at least two scanning line conversion ratios of the number of scanning lines.

\* \* \* \* \*